(12) United States Patent
Nam et al.

(10) Patent No.: US 9,119,209 B2
(45) Date of Patent: Aug. 25, 2015

(54) APPARATUS AND METHOD FOR CHANNEL-STATE-INFORMATION PILOT DESIGN FOR AN ADVANCED WIRELESS NETWORK

(71) Applicant: Samsung Electronics Co., Ltd., Gyeonggi-do (KR)

(72) Inventors: Young-Han Nam, Richardson, TX (US); Jin-Kyu Han, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 134 days.

(21) Appl. No.: 13/828,530

(22) Filed: Mar. 14, 2013

(65) Prior Publication Data

US 2013/0258964 A1 Oct. 3, 2013

Related U.S. Application Data

(60) Provisional application No. 61/618,213, filed on Mar. 30, 2012, provisional application No. 61/635,152, filed on Apr. 18, 2012.

(51) Int. Cl.
*H04W 72/04* (2009.01)
*H04L 1/00* (2006.01)
(Continued)

(52) U.S. Cl.
CPC ............ *H04W 72/046* (2013.01); *H04L 1/0053* (2013.01); *H04W 72/04* (2013.01); *H04W 88/02* (2013.01); *H04W 88/08* (2013.01)

(58) Field of Classification Search
USPC ......... 370/328, 329, 330, 252, 334, 436, 310, 370/312, 347, 337, 344, 320; 455/101, 455/562.1, 561, 450
See application file for complete search history.

(56) References Cited

U.S. PATENT DOCUMENTS 6,950,678 B1 * 9/2005 Mujtaba et al. ............ 455/562.1
2005/0002468 A1 * 1/2005 Walton et al. ................ 375/267
(Continued)

FOREIGN PATENT DOCUMENTS

KR 20100138261 A 12/2010
KR 20110091839 A 8/2011
(Continued)

OTHER PUBLICATIONS

International Search Report dated Sep. 24, 2013 in connection with International Patent Application No. PCT/KR2013/002688, 4 pages.
Written Opinion of International Searching Authority dated Sep. 24, 2013 in connection with International Patent Application No. PCT/KR2013/002688, 6 pages.

(Continued)

*Primary Examiner* — Habte Mered
*Assistant Examiner* — Rownak Islam

(57) ABSTRACT

A base station and mobile station communicate using a multiple input multiple output (MIMO) communication. The base station includes a two dimensional (2D) antenna array comprising a number N of antenna elements configured in a 2D grid. The 2D antenna array is configured to communicate with at least one subscriber station. The base station also includes a controller configured to transmit N channel-state-information reference-signal (CSI-RS) antenna ports (APs) associated with each of the N antenna elements. The subscriber station includes an antenna array configured to communicate with at least one base station. The subscriber station also includes processing circuitry configured receives physical downlink shared channels (PDSCHs) from a 2D active antenna array at the at least one base station. The 2D active antenna array includes a number N antenna elements. The processing circuitry further configured to estimate a full CSI associated with the N antenna elements.

18 Claims, 13 Drawing Sheets

(51) Int. Cl.
*H04W 88/08* (2009.01)
*H04W 88/02* (2009.01)

(56) References Cited

U.S. PATENT DOCUMENTS

2012/0281783 A1* 11/2012 Cheng et al. .................. 375/295
2012/0287875 A1* 11/2012 Kim et al. ..................... 370/329
2013/0229980 A1* 9/2013 Wernersson et al. ......... 370/328

FOREIGN PATENT DOCUMENTS

KR  20120015977 A  2/2012
KR  20120029338 A  3/2012
WO  WO 2009/083960 A2  7/2009

OTHER PUBLICATIONS

Tran, et al.; "Overview of enabling technologies for 3GPP LTE-advanced"; EURASIP Journal on Wireless Communications and Networking 2012; Feb. 20, 2012; 12 pages.

* cited by examiner

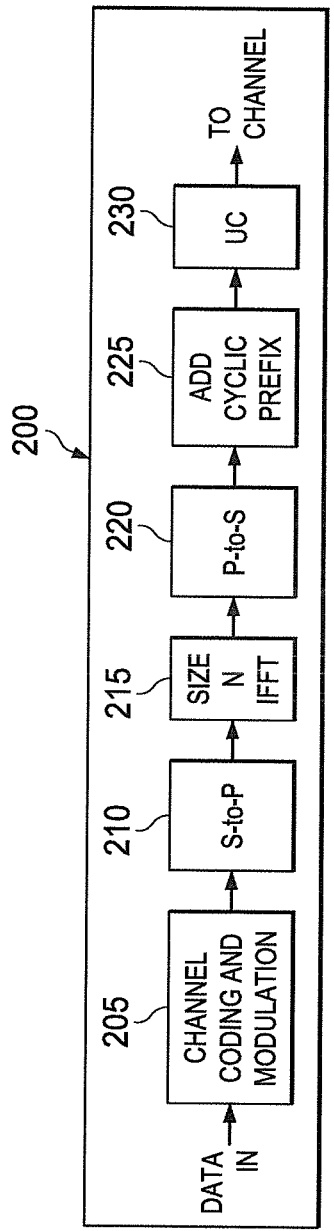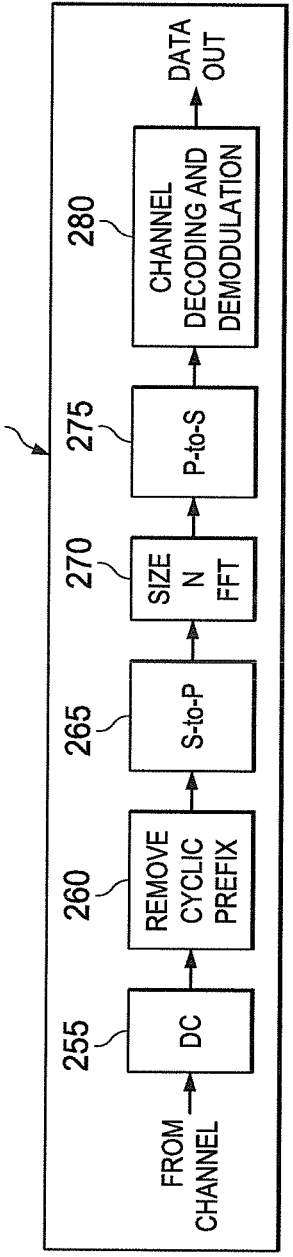
FIG. 2A
FIG. 2B

APPARATUS AND METHOD FOR CHANNEL-STATE-INFORMATION PILOT DESIGN FOR AN ADVANCED WIRELESS NETWORK

CROSS-REFERENCE TO RELATED APPLICATION(S) AND CLAIM OF PRIORITY

The present application claims priority to U.S. Provisional Patent Application Ser. No. 61/618,213, filed Mar. 30, 2012, entitled "CHANNEL-STATE-INFORMATION PILOT DESIGN FOR ADVANCED WIRELESS COMMUNICATIONS SYSTEM" and U.S. Provisional Patent Application Ser. No. 61/635,152, filed Apr. 18, 2012, entitled "CHANNEL-STATE-INFORMATION PILOT DESIGN FOR ADVANCED WIRELESS COMMUNICATIONS SYSTEM". The content of the above-identified patent documents is incorporated herein by reference.

TECHNICAL FIELD

The present application relates generally to wireless communication systems and, more specifically, to a channel-state-information pilot design for advanced wireless communications system.

BACKGROUND

3GPP Long Term Evolution (LTE) and Long Term Evolution Advanced (LTE-A) systems may operates in a Frequency Division Duplex (FDD) mode or a Time Division Duplex (TDD) mode. In the FDD mode, two different frequencies are used for uplink and downlink transmission, and the base station and user equipment may send and receive data at the same time. In the TDD mode, the same frequency is used for uplink and downlink transmission, and the base station and user equipment cannot send and receive data at the same time. Therefore, in the TDD mode, the LTE system has configurations specifying subframes for either uplink or downlink.

SUMMARY

A base station is provided. The base station includes a two dimensional (2D) antenna array comprising a number N of antenna elements configured in a 2D grid $N_H \times N_V$. The 2D antenna array is configured to communicate with at least one subscriber station. The base station also includes a controller configured to transmit N channel-state-information reference-signal (CSI-RS) antenna ports (APs) associated with each of the N antenna elements.

A subscriber station is provided. The subscriber station includes an antenna array configured to communicate with at least one base station. The subscriber station also includes processing circuitry configured receives physical downlink shared channels (PDSCHs) from a 2D active antenna array at the at least one base station. The 2D active antenna array includes a number N antenna elements. The processing circuitry further configured to estimate a horizontal and vertical CSI associated with the N antenna elements.

A method is provided. The method includes transmitting, from a two dimensional (2D) antenna array, N channel-state-information reference-signal (CSI-RS) antenna ports (APs). The 2D antenna array includes a number N of antenna elements configured in a 2D grid $N_H \times N_V$. The CSI-RS APs is associated with each of the N antenna elements.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a high-level diagram of a wireless transmit path according to embodiments of the present disclosure;

FIG. 2B illustrates a high-level diagram of a wireless receive path according to embodiments of the present disclosure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v10.1.0, "E-UTRA, Physical channels and modulation" (REF1); 3GPP TS 36.212 v10.1.0, "E-UTRA, Multiplexing and Channel coding" (REF2); 3GPP TS 36.213 v10.1.0, "E-UTRA, Physical Layer Procedures" (REF 3); and 3GPP TS 36.331 V10.1.0 (REF4).

Figure 1:
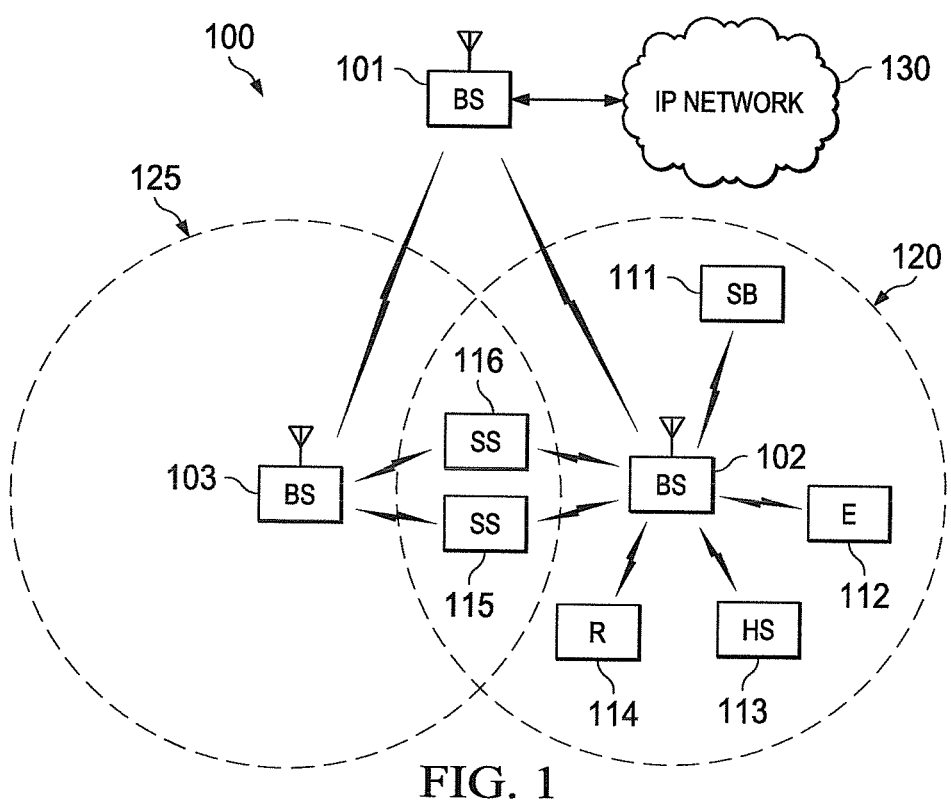
FIG. 1 illustrates a wireless network according to embodiments of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes a base sta eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term "user equipment" or "UE" is used herein to designate any remote wireless equipment that wirelessly accesses an eNB and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using 5G, LTE, LTE-A, or WiMAX techniques including techniques for using a new channel-state-information pilot design as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for communication using a new channel-state-information pilot design as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
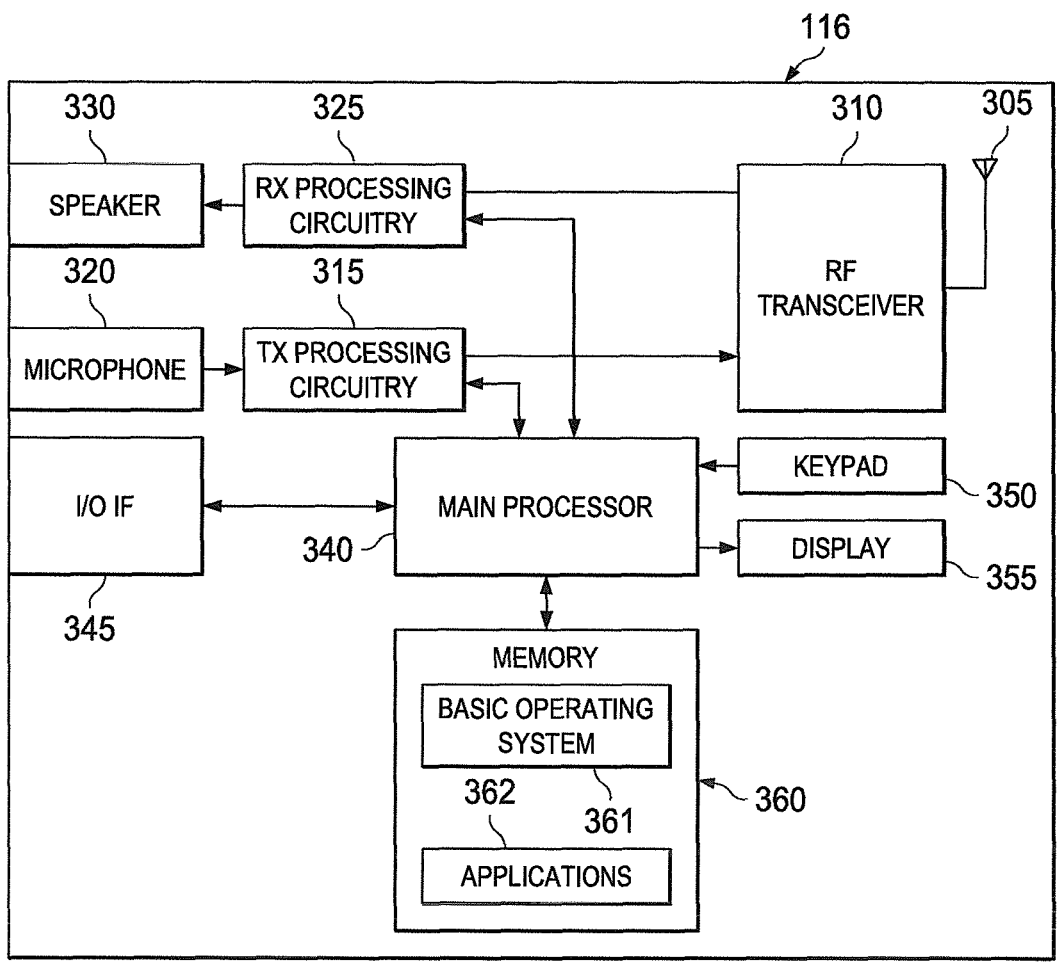
FIG. 3 illustrates a subscriber station according to embodiments of the present disclosure.

FIG. 3 illustrates a subscriber station according to embodiments of the present disclosure. The embodiment of subscribe station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. Although shown as a single antenna, antenna 305 can include multiple antennas. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for performing communications including a new channel-state-information pilot design as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Embodiments of the present disclosure provide methods and apparatus to for a channel-state-information (CSI) pilot design for advanced wireless communications system. In REF4, the following configuration is defined for channel-state-information reference signal (CSI-RS). A information element (IE) CSI-RS configuration (CSI-RS-Config) is used to specify the CSI-RS configuration as shown in here:

CSI-RS-Config information elements

```
-- ASN1START
CSI-RS-Config-r10 ::=    SEQUENCE {
    csi-RS-r10           CHOICE {
        release                      NULL,
        setup                        SEQUENCE {
            antennaPortsCount-r10        ENUMERATED {an1, an2, an4, an8},
```

-continued

| CSI-RS-Config information elements |
|---|
|         resourceConfig-r10     INTEGER (0..31),<br>        subframeConfig-r10      INTEGER (0..154),<br>        p-C-r10     INTEGER (−8..15)<br>       }<br>   }                                                  OPTIONAL, -- Need ON<br>   zeroTxPowerCSI-RS-r10     CHOICE {<br>      release     NULL,<br>      setup     SEQUENCE {<br>        zeroTxPowerResourceConfigList-r10     BIT STRING (SIZE (16)),<br>        zeroTxPowerSubframeConfig-r10     INTEGER (0..154)<br>      }<br>   }                                                  OPTIONAL  -- Need ON<br>}<br>-- ASN1STOP | the CSI-RS-Config field descriptions as follows:

| CSI-RS-Config field descriptions |
|---|
| antennaPortsCount<br>Parameter represents the number of antenna ports used for transmission of CSI reference signals where an1 corresponds to 1, an2 to 2 antenna ports etc. see TS 36.211 [21, 6.10.5].<br>p-C<br>Parameter: $P_c$, see TS 36.213 [23, 7.2.5].<br>resourceConfig<br>Parameter: CSI reference signal configuration, see TS 36.211 [21, table 6.10.5.2-1 and 6.10.5.2-2].<br>subframeConfig |

| CSI-RS-Config field descriptions |
|---|
| Parameter: $I_{CSI\text{-}RS}$, see TS 36.211 [21, table 6.10.5.3-1].<br>zeroTxPowerResourceConfigList<br>Parameter: ZeroPowerCSI-RS, see TS 36.211 [21, 6.10.5.2].<br>zeroTxPowerSubframeConfig<br>Parameter: $I_{CSI\text{-}RS}$, see TS 36.211 [21, table 6.10.5.3-1]. |

Also, according to section 6.10.5.2 Mapping to resource elements in REF1, CSI-RS mapping to resource elements are described as—In subframes configured for CSI reference signal transmission, the reference signal sequence $r_{l,n_s}(m)$ is mapped to complex-valued modulation symbols $a_{k,l}^{(p)}$ used as reference symbols on antenna port p according to Equation 1:

$$a_{k,l}^{(p)} = w_{l''} \cdot r_{l,n_s}(m') \tag{1}$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations } 0 - 19, \text{ normal cyclic prefix} \\ 2l'' & \text{CSI reference signal configurations } 20 - 31, \text{ normal cyclic prefix} \\ l'' & \text{CSI reference signal configurations } 0 - 27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and the necessary conditions on $n_s$ are given by TABLE 1 for normal cyclic prefix.

TABLE 1

Mapping from CSI reference signal configuration to (k', l') for normal cyclic prefix

| CSI reference signal Configuration (resourceConfig) | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

According to section 6.10.5.3—CSI reference signal subframe configuration, the cell-specific subframe configuration period $T_{CSI\text{-}RS}$ and the cell-specific subframe offset $\Delta_{CSI\text{-}RS}$ for the occurrence of CSI reference signals are listed in TABLE 2. The parameter $I_{CSI\text{-}RS}$ can be configured separately for CSI reference signals for which UE 116 assume non-zero and zero transmission power. Subframes containing CSI reference signals shall satisfy Equation 2:

$$(10n_f + \lfloor n_s/2 \rfloor - \Delta_{CSI\text{-}RS}) \bmod T_{CSI\text{-}RS} = 0. \quad (2)$$

TABLE 2

CSI reference signal subframe configuration

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

In REF1, CSI-RS sequence generation is explained as in the following section 6.10.5.1-Sequence generation:

The reference-signal sequence $r_{l,n_s}(m)$ is defined by Equation 3:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (3)$$

$$m = 0, 1, \ldots, N_{RB}^{max,DL} - 1$$

where $n_s$ is the slot number within a radio frame and l is the OFDM symbol number within the slot. The pseudo-random sequence c(i) is defined in Section 7.2. The pseudo-random sequence generator is initialized with $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad (4)$$

at the start of each OFDM symbol.

Further, for CSI-RS configuration for CoMP: Configuration of multiple non-zero-power CSI-RS resources includes at least:
 antennaPortsCount, resourceConfig
  Independently configured among CSI-RS resources
 subframeConfig
  Whether common or independent among CSI-RS resources is FFS
 Configurable parameter to derive the pseudo-random sequence generator initialisation ($c_{init}$)

$c_{init}$ is independently configured among CSI-RS resources, $$C_{init}=2^{10} \cdot (7 \cdot (n_s+1)+1+1) \cdot (2 \cdot X+1)+2 \cdot X+N_{CP} \qquad (5)$$

where X is configurable in a UE-specific manner and may take on any value in the range of 0 to 503, FFS whether Rel-10 formula can be used without a change FFS whether beyond 503 are supported FFS whether CSI-RS ports always have the same scrambling or can have different scrambling within a CSI-RS resource $P_c$ Details of signaling is FFS.

Additional Parameters May be Considered

Quasi Co-location: Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

CSI Process: UE 116 in transmission mode 10 can be configured with one or more CSI processes per serving cell by higher layers. Each CSI process is associated with a CSI-RS resource (defined in Section 7.2.5) and a CSI-interference measurement (CSI-IM) resource (defined in Section 7.2.6). A CSI reported by UE 116 corresponds to a CSI process configured by higher layers. Each CSI process can be configured with or without PMI/RI reporting by higher layer signalling.

For UE 116 in transmission mode 10, UE 116 derives the interference measurements for computing the CQI value reported in uplink subframe n and corresponding to a CSI process, based on only the zero power CSI-RS (defined in REF3) within the configured CSI-IM resource associated with the CSI process. If UE 116 in transmission mode 10 is configured by higher layers for CSI subframe sets $C_{CSI,0}$ and $C_{CSI,1}$, the configured CSI-IM resource within the subframe subset belonging to the CSI reference resource is used to derive the interference measurement.

CSI-Process: the IE CSI-Process is the CSI process configuration that E-UTRAN can configure on a serving frequency.

CSI-Process information elements

```
CSI-Process-r11 ::=    SEQUENCE {
    csi-ProcessIdentity-r11          CSI-ProcessIdentity-r11,
    csi-RS-IdentityNZP-r11           CSI-RS-IdentityNZP-r11,
    csi-IM-Identity-r11              CSI-IM-Identity-r11,
    p-C-AndAntennaInfoDedList-r11 SEQUENCE (SIZE (1..2)) OF P-C-AndAntennaInfoDed-r11,
    cqi-ReportBothPS-r11             CQI-ReportBothPS-r11              OPTIONAL,  -- Need OR
    cqi-ReportPeriodicId-r11 INTEGER (0..maxCQI-Ext-r11)               OPTIONAL,  -- Need OR
    cqi-ReportAperiodicPS-r11        CQI-ReportAperiodicPS-r11         OPTIONAL,  -- Need OR
    ...
}
P-C-r11 ::=            INTEGER (-8..15)
P-C-AndAntennaInfoDed-r11 ::= SEQUENCE {
    p-C-r11                          P-C-r11,
    antennaInfoDedConfigId-r11       AntennaInfoConfigDedId-r11
}
```

CSI-Process field descriptions antennaInfoDedConfigId
Refers to a dedicated antenna info configuration that is configured for the same frequency as the CSI process.
csi-IM-Identity
Refers to a CSI-IM configuration that is configured for the same frequency as the CSI process.
csi-RS-IdentityNZP
Refers to a CSI RS configuration that is configured for the same frequency as the CSI process.
cqi-ReportBothPS
Includes CQI configuration parameters applicable for both aperiodic and periodic CSI reporting, for which CSI process specific values may be configured. E-URAN configures the field if and only if cqi-ReportPeriodicId is included and/or if cqi-ReportAperiodicPS is included and set to setup.
cqi-ReportPeriodicId
Refers to a periodic CQI reporting configuration that is configured for the same frequency as the CSI process. Value 0 refers to the set of parameters defined by the REL-10 CQI reporting configuration fields, while the other values refer to the additional configurations E-UTRAN assigns by CQI-ReportPeriodicExt-r11 (and as covered by CQI-ReportPeriodicExtId).
p-C
Parameter: $P_c$, see TS 36.213 [23, 7.2.5].
p-C-AndAntennaInfoDedList
A p-C-AndAntennaInfoDedList including 2 entries indicates that the subframe patterns configured for CSI (CQI/PMI/PTI/RI) reporting (i.e. as defined by field csi-MeasSubframeSet1 and csi-MeasSubframeSet2) are to be used for this CSI process, while a single entry indicates that the subframe patterns are not to be used for this CSI process. E-UTRAN does not include 2 entries in p-C-AndAntennaInfoDedList for CSI processes concerning a secondary frequency. E-UTRAN includes 2 entries in p-C-AndAntennaInfoDedList when configuring both cqi-pmi-ConfigIndex and cqi-pmi-ConfigIndex2.

CSI-ProcessIdentity: the IE CSI-ProcessIdentity is used to identify a CSI process that is configured by the IE CSI-Process. The identity is unique within the scope of a carrier frequency.

CSI-ProcessIdentity Information Elements

CSI-ProcessIdentity-r11::= INTEGER (1 . . . maxCSI-Proc-r11)

CSI-RS-ConfigNZP: the IE CSI-RS-ConfigNZP is the CSI-RS resource configuration using non-zero power transmission that E-UTRAN may configure on a serving frequency.

| CSI-RS-ConfigNZP information elements |
| --- |
| CSI-RS-ConfigNZP-r11 ::=   SEQUENCE {<br>    csi-RS-IdentityNZP-r11         CSI-RS-IdentityNZP-r11,<br>    antennaPortsCount-r11          ENUMERATED {an1, an2, an4, an8},<br>    resourceConfig-r11             INTEGER (0..31),<br>    subframeConfig-r11             INTEGER (0..154),<br>    scramblingIdentity-r11         INTEGER (0..503),<br>    qcl-CRS-Info-r11               SEQUENCE {<br>        qcl-ScramblingIdentity-r11   INTEGER (0..503),<br>        crs-PortsCount-r11           ENUMERATED {n1, n2, n4, spare1},<br>        mbsfn-SubframeConfig-r11     MBSFN-SubframeConfig OPTIONAL,-- Need OR<br>    }                                                   OPTIONAL,-- Need OR<br>    ...<br>} |

CSI-RS-ConfigZP: the IE CSI-RS-ConfigZP is the CSI-RS resource configuration, for which UE 116 assumes zero transmission power, that E-UTRAN can configure on a serving frequency.

| CSI-RS-ConfigZP information elements |
| --- |
| CSI-RS-ConfigZP-r11 ::=         SEQUENCE {<br>    csi-RS-IdentityZP-r11         CSI-RS-IdentityZP-r11,<br>    resourceConfigList-r11        BIT STRING (SIZE (16)),<br>    subframeConfig-r11            INTEGER (0..154)<br>} |

| CSI-RS-ConfigZP field descriptions |
| --- |
| resourceConfigList<br>Parameter: CSI reference signal configuration, see TS 36.211 [21, table 6.10.5.2-1 and 6.10.5.2-2].<br>subframeConfig<br>Parameter: $I_{CSI-RS}$, see TS 36.211 [21, table 6.10.5.3-1]. |

CSI-RS-IdentityNZP: the IE CSI-RS-IdentityNZP is used to identify a CSI-RS resource configuration using non-zero transmission power, as configured by the IE CSI-RS-ConfigNZP. The identity is unique within the scope of a carrier frequency.

CSI-RS-IdentityNZP Information Elements

CSI-RS-IdentityNZP-r11::= INTEGER (1 . . . maxCSI-RS-NZP-r11)

CSI-RS-IdentityZP: the IE CSI-RS-IdentityZP is used to identify a CSI-RS resource configuration for which UE assumes zero transmission power, as configured by the IE CSI-RS-ConfigZP. The identity is unique within the scope of a carrier frequency.

CSI-RS-IdentityZP Information Elements

CSI-RS-IdentityZP-r11::= INTEGER (1 . . . maxCSI-RS-ZP-r11)

RRC Multiplicity and Type Constraint Values:

Multiplicity and Type Constraint Definitions

| | | |
| --- | --- | --- |
| maxCSI-IM-r11 | INTEGER ::= 3 | -- Maximum number of CSI-IM configurations<br>-- (per frequency) |
| maxCSI-Proc-r11 | INTEGER ::= 4 | -- Maximum number of CSI RS processes (per frequency) |
| maxCSI-RS-NZP-r11 | INTEGER ::= 3 | -- Maximum number of CSI RS resource<br>-- configurations using non-zero Tx power<br>-- (per frequency) |
| maxCSI-RS-ZP-r11 | INTEGER ::= 4 | -- Maximum number of CSI RS resource<br>-- configurations using zero Tx power(per frequency) |
| maxCQI-Ext-r11 | INTEGER ::= 3 | -- Maximum number of additional periodic CQI<br>-- configurations (per frequency) |

CSI-IM-CONFIG: the IE CSI-IM-Config is the CSI-IM configuration that E-UTRAN may configure on a serving frequency.

| CSI-IM-Config information elements |
| --- |
| CSI-IM-Config-r11 ::=   SEQUENCE {<br>    csi-im-Identity-r11      CSI-IM-Identity-r11,<br>    resourceConfig-r11       INTEGER (0..15), |

-continued

| CSI-IM-Config information elements |  |
|---|---|
| subframeConfig-r11 | INTEGER (0..154), |
| ... |  |
| } |  |

| CSI-IM-Config field descriptions |
|---|
| resourceConfig<br>Parameter: CSI-IM configuration, see TS 36.211 [21, table 6.10.5.2-1 and 6.10.5.2-2] for 4 REs.<br>subframeConfig<br>Parameter: $I_{CSI-RS}$, see TS 36.211 [21, table 6.10.5.3-1]. |

CSI-IM-Identity: the IE CSI-IM-Identity is used to identify a CSI-IM configuration that is configured by the IE CSI-IM-Config. The identity is unique within the scope of a carrier frequency.

CSI-IM-Identity Information Elements

CSI-IM-Identity-r11::= INTEGER (1 . . . maxCSI-IM-r11)

Figure 4:
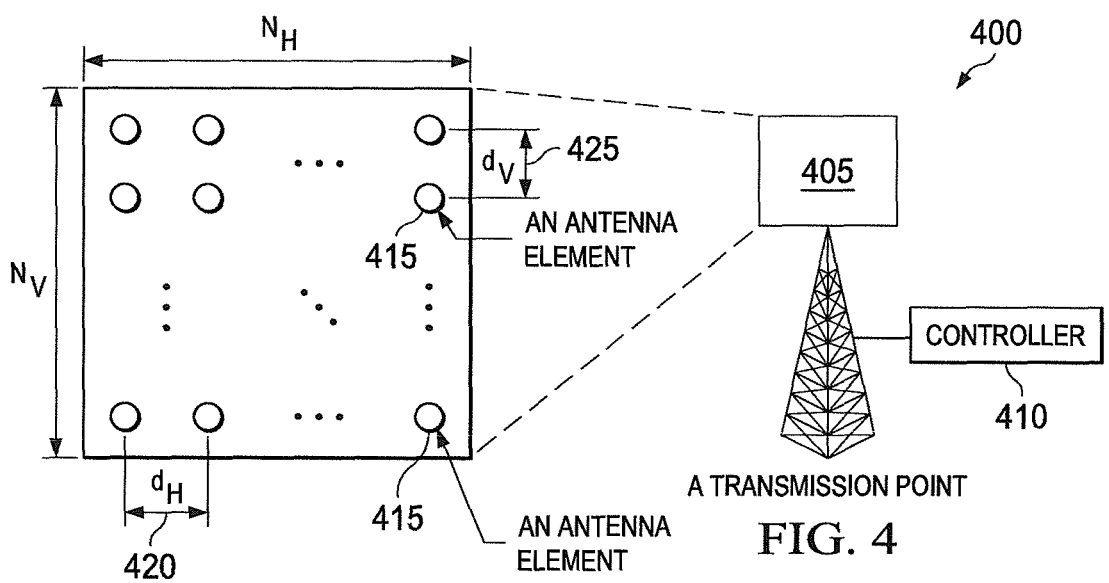
FIG. 4 illustrates a transmission point equipped with 2D active antenna array according to embodiments of the present disclosure.

Various embodiments of the present disclosure consider pilot transmissions from transmission points equipped with 2-dimensional (2D) active antenna array depicted in FIG. 4. Here, transmission points (TPs) are a network node can transmit downlink signals and receive uplink signals in a cellular network, examples of which include base stations, NodeBs, enhanced NodeBs (eNBs) remote radio heads (RRHs), and so forth. Alternatively, an entity controlling at least one TP is called the controller, the network or eNB. Each active antenna array may have separate base band, which could dynamically control the antenna weights in frequency selective manner.

FIG. 4 illustrates a transmission point equipped with 2D active antenna array according to embodiments of the present disclosure. The embodiment of the transmission point 400 shown in FIG. 4 is for illustration only. Other embodiments could be used without departing from the scope of this disclosure.

The transmission point 400 includes an antenna array 405 and a controller 410. The Antenna array 405 that includes N (=$N_H \times N_V$) 2D active antenna elements 415, and the N antenna, elements are placed in 2D grid of $N_H \times N_V$. The horizontal spacing between any two closest antenna elements is denoted by $d_H$ 420, and the vertical spacing between any two closest antenna elements is denoted by $d_V$ 425.

Figure 5:
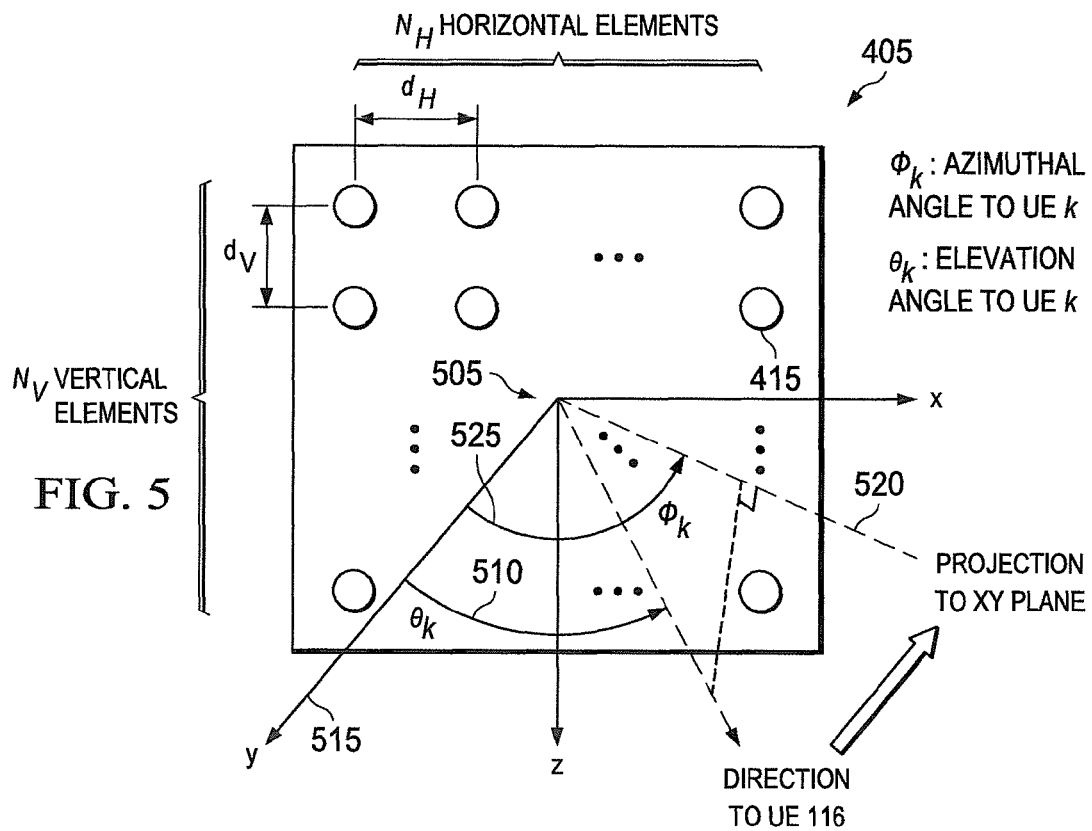
FIG. 5 illustrates azimuth and elevation angles to a mobile station from the 2D active antenna array according to embodiments of the present disclosure.

FIG. 5 illustrates azimuth and elevation angles to a mobile station from the 2D active antenna array according to embodiments of the present disclosure. The embodiment of the 2D active antenna array 405 shown in FIG. 5 is for illustration only. Other embodiments could be used without departing from the scope of this disclosure.

A transmission vector between the transmission point 400 equipped with 2D antenna array and UE 116 is transmitted at azimuth and elevation angles. In the example placement shown in FIG. 5, antenna elements 415 are placed in a rectangle on XZ plane in an orthogonal XYZ coordinate system. The origin 505 of the coordinate system is placed at the center of the rectangle. The azimuth (horizontal) angle $\theta_k$ 510 for UE 116 is defined as the angle between Y axis 515 and the projection vector 520 of a straight line between the TP and UE 116 to the XY plane. Alternatively, the elevation (vertical) angle $\theta_k$ 525 is defined as the angle between Y axis and the projection vector of the straight line to the YZ plane.

In the cellular networks, the network utilizes UEs' channel state information (CSI) to schedule time-frequency resources, to select precoders and modulation and coding schemes (MCS) for each individual UE. To facilitate the UEs' CSI estimation, the network can configure and transmit CSI reference signals (CSI-RS). At the same time, each UE can be configured to feed back estimated precoding matrix information (PMI), channel quality information (CQI) and rank information (RI), by receiving and processing the CSI-RS. Traditionally, the UEs' CSI feedback is designed with mainly targeting horizontal CSI associated with the azimuth angles. For example, PMI/CQI feedback for downlink beamforming in LTE informs the eNB the horizontal direction (or the azimuth angle) along which the UE receives the strongest signal and the associated channel strength. When active antenna array elements are introduced in the vertical domain as well, the necessity of vertical CSI feedback emerges. To facilitate the vertical CSI feedback, the corresponding CSI-RS design is crucial.

Embodiments of the present disclosure illustrate CSI-RS designs and associated configuration methods to be used in the wireless communication networks (e.g., cellular networks) having TPs equipped with 2D active antenna array. It is noted that unless otherwise specified, the CSI-RS disclosed herein refers to NZP CSI-RS.

A new transmission mode (TM), referenced hereinafter as TM X, is defined for helping UEs' reception from the 2D active antenna array 405. When UE 116 is configured with TM X, UE 116 receives PDSCHs from the 2D active antenna array 405, and is configured with a newly designed CSI-RS. The MIMO transmission from the 2D active antenna array 405 is also referenced as full-dimensional MIMO or FD-MIMO.

In one method (method 1), TP 400 is capable of transmitting all the N CSI-RS antenna ports (APs) associated with each of the N antenna elements 415, and the network is capable of configuring all the N CSI-RS APs to each UE using a UE-specific RRC configuration or a broadcast signaling, so that UE 116 can estimate the full CSI associated with the N antenna elements 415.

In another method (method 2), TP 400 is capable of transmitting at least two sets of CSI-RS APs, and the network is capable of configuring the at least two sets of CSI-RS APs to each UE, wherein UE 116 derives and feeds back horizontal CSI (H-CSI) and vertical CSI (V-CSI) estimated by receiving and processing the at least two sets of CSI-RS. Here the total number of CSI-RS APs can be less than N, and hence the CSI-RS transmission overhead is reduced as compared to method 1.

For Horizontal CSI and vertical CSI: the H-CSI of a UE is horizontal CSI estimated at UE 116, which are channel characteristics mainly associated with horizontally placed antenna elements 415 at TP 400. The horizontal CSI includes horizontal CQI (H-CQI), horizontal PMI (H-PMI) and horizontal RI (H-RI). For example, the H-CSI can be the same as the CSI (PMI, CQI and RI) in another LTE system, because the certain LTE systems CSI feedback contents and mechanism are designed considering horizontal antenna array.

The V-CSI of a UE is vertical CSI estimated at UE 116, which are channel characteristics mainly associated with vertically placed antenna elements at TP 400. The vertical CSI includes vertical CQI (V-CQI), vertical PMI (V-PMI) and vertical RI (V-RI).

Figure 6:
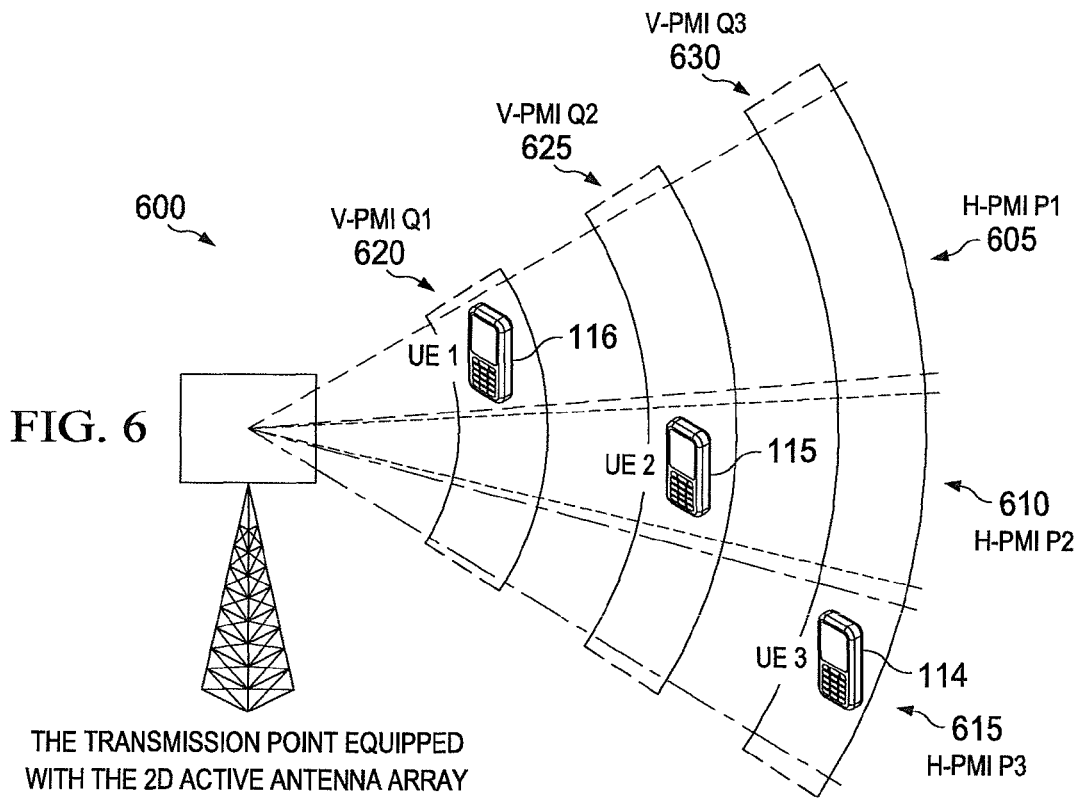
FIG. 6 illustrates H-PMI and V-PMI according to embodiments of the present disclosure.

FIG. 6 illustrates H-PMI and V-PMI according to embodiments of the present disclosure. The embodiment of the H-PMI and V-PMI 600 shown in FIG. 6 is for illustration only. Other embodiments could be used without departing from the scope of this disclosure.

In certain embodiments, UE 1 116, UE 2 115 and UE 3 114 receives the strongest signal when the (H-PMI, V-PMI) pairs are (P1,Q1), (P2,Q2) and (P3,Q3), respectively, according to their respective horizontal directions (or azimuth angles) and vertical directions (or elevation angles). When configured to feed back H-PMIs, UE 1 116, UE 2 115 and UE 3 114 report H-PMIs P1 605, P2 610 and P3 615, respectively. When configured to feed back V-PMIs, UE 1 116, UE 2 115 and UE 3 114 report V-PMIs Q1 620, Q2 625 and Q3 630, respectively.

As for CQI, two feedback methods can be considered: 1) H-CQI and V-CQI are separately derived and are independently fed back to the network; and 2) One joint CQI is derived and is fed back to the network for the N antenna channel. In one design, UE 116 constructs a desired precoding matrix for the N-Tx antenna channel using H-PMI and V-PMI, and calculates a received power under the assumption that the TP transmits signals using the precoding matrix. From the received power, UE 116 derives CQI, where the CQI can be a desired MCS. In one example, the desired precoding matrix is found by taking Kronecker product of H-PMI=$[p_1, p_2, \ldots, p_{N_H}]^t \in C^{N_H \times 1}$ and V-PMI=$[q_1, q_2, \ldots, q_{N_H}]^t \in C^{N_V \times 1}$. In this case, when $N_H=2$, $N_V=2$, H-RI=1 and V-RI=1, the Kronecker product would be calculated as in the Equations 5 and 6:

$$H - PMI \otimes V - PMI = \begin{bmatrix} p_1 \\ p_2 \end{bmatrix} \otimes \begin{bmatrix} q_1 \\ q_2 \end{bmatrix} = \begin{bmatrix} p_1 q_1 \\ p_1 q_2 \\ p_2 q_1 \\ p_2 q_2 \end{bmatrix}, \quad (5)$$

$$V - PMI \otimes H - PMI = \begin{bmatrix} q_1 \\ q_2 \end{bmatrix} \otimes \begin{bmatrix} p_1 \\ p_2 \end{bmatrix} = \begin{bmatrix} q_1 p_1 \\ q_1 p_2 \\ q_2 p_1 \\ q_2 p_2 \end{bmatrix}. \quad (6)$$

Joint RI is the rank information about the MIMO channels between the N-Tx antenna and a number of receive antennas at the UE.

For ease of illustration, the example shown in FIG. 6 illustrates only line-of-sight channels. However, the non-line-of-sight channels, the V-CSI and H-CSI can be described and defined in a similar way. The example shown in FIG. 6 is for illustration only and it does not prevent other similar constructions and definitions of V-CSI and H-CSI.

Figure 7:
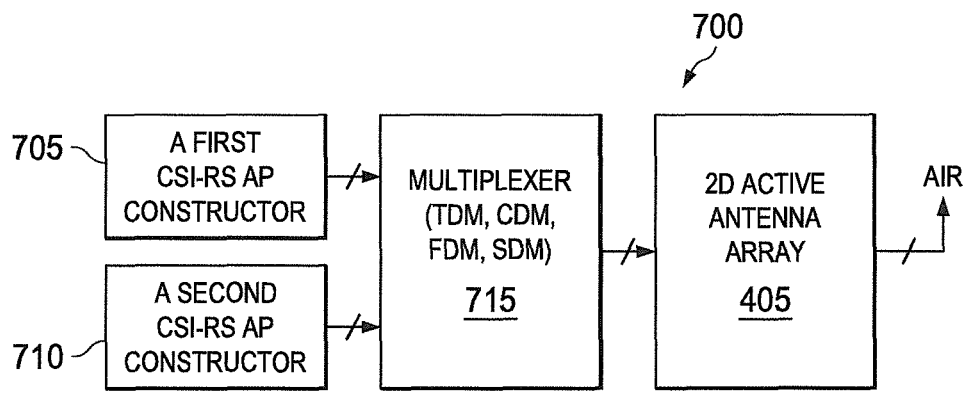
FIG. 7 illustrates a first and a second CSI-RS APs according to embodiments of the present disclosure.

FIG. 7 illustrates a first and a second CSI-RS APs according to embodiments of the present disclosure. The embodiment of the transmitter chain 700 including the first and second CSI-RS APs shown in FIG. 7 is for illustration only. Other embodiments could be used without departing from the scope of the present disclosure.

The transmitter chain 700 is configured for multiplexing a first set of CSI-RS 705 (denoted by A-CSI-RS APs) and a second set of CSI-RS APs 710 (denoted by B-CSI-RS APs) for the at least two sets of CSI-RS APs. Here, the multiplexer operation 715 for A-CSI-RS APs 705 and B-CSI-RS APs 710 can be time-domain multiplexing (TDM), CDM (code-domain multiplexing), FDM (frequency-domain multiplexing) and SDM (spatial-domain multiplexing) and any combination of TDM, FDM, CDM and SDM. When TDM multiplexing is applied, A-CSI-RS APs 705 and B-CSI-RS APs 710 transmit their CSI-RS at two different time location, e.g., in two different time slots, or in two different subframes, or in two different sets of OFDM symbols. When FDM multiplexing is applied, A-CSI-RS APs 705 and B-CSI-RS APs 710 transmit their CSI-RS at two different frequency (or subcarrier) location. When CDM multiplexing is applied, A-CSI-RS APs 705 and B-CSI-RS APs 710 transmit their CSI-RS using two different orthogonal codes (e.g., Walsh code, CAZAC code) in the same time-frequency location. When SDM is applied, A-CSI-RS APs 705 and B-CSI-RS APs 710 transmit their CSI-RS in two different spatial beams, and they can be differently scrambled using two different scrambling initializations. Some example combinations of TDM, CDM, FDM and SDM are described below. When FDM/TDM multiplexing is applied, A-CSI-RS APs 705 and B-CSI-RS APs 710 transmit their CSI-RS at two different time-frequency location. Two sets of CSI-RS APs are (quasi) co-located if large-scale propagation properties of the channel over which a symbol on the first antenna port is conveyed can be inferred from the channel over which another symbol on the other antenna port is conveyed.

In certain embodiments, for deriving at least one of joint CQI, joint PMI and joint RI for the $N=N_H \times N_V$ antenna channels utilizing the two sets of CSI-RS, UE 116 can assume that the two sets of CSI-RS APs are (quasi) co-located. In certain embodiments, the network can indicate whether UE 116 can assume that the two sets of CSI-RS APs are (quasi) co-located or not for deriving joint CQI, joint PMI and joint RI.

In certain embodiments, (A-CSI-RS, B-CSI-RS) can be (H-CSI-RS, V-CSI-RS), (a first H-CSI-RS, a second H-CSI-RS), (a primary CSI-RS, a secondary CSI-RS), as illustrated in later embodiments.

In certain embodiments, the CSI-RS configurations defined in Rel-10 LTE or Rel-11 LTE is reused for configuring each of A-CSI-RS and B-CSI-RS. When Rel-10 LTE CSI-RS configuration is used, some of the following parameters in the Table 3 are separately configured for each of A-CSI-RS and B-CSI-RS.

TABLE 3

| CSI-RS-Config field descriptions |
| --- |
| AntennaPortsCount<br>Parameter represents the number of antenna ports used for transmission of CSI reference signals where an1 corresponds to 1, an2 to 2 antenna ports etc. see TS 36.211 [21, 6.10.5].<br>p-C<br>Parameter: $P_c$, see TS 36.213 [23, 7.2.5].<br>resourceConfig<br>Parameter: CSI reference signal configuration, see TS 36.211 [21, table 6.10.5.2-1 and 6.10.5.2-2].<br>subframeConfig<br>Parameter: $I_{CSI-RS}$, see TS 36.211 [21, table 6.10.5.3-1]. |

When Rel-11 LTE NZP CSI-RS configuration is used, some of the parameters defining a CSI-RS-ConfigNZP-r11 (whose fields are copied below and in the background section) are separately configured for each of A-CSI-RS and B-CSI-RS.

```
CSI-RS-ConfigNZP-r11 ::=    SEQUENCE {
    csi-RS-IdentityNZP-r11        CSI-RS-IdentityNZP-r11,
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503),
    qcl-CRS-Info-r11              SEQUENCE {
        qcl-ScramblingIdentity-r11    INTEGER (0..503},
        crs-PortsCount-r11            ENUMERATED {n1, n2, n4, spare1},
        mbsfn-SubframeConfig-r11      MBSFN-SubframeConfig OPTIONAL,-- Need OR
    }                                                    OPTIONAL,-- Need OR
    ...
}
```

The resource configurations (resourceConfig) and AntennaPortsCount for A-CSI-RS and B-CSI-RS can be independently or jointly configured.

In one example of independent configuration, (A-resourceConfig, A-AntennaPortsCount) and (B-resourceConfig, B-AntennaPortCount) are configured for A-CSI-RS and B-CSI-RS. When these are configured to UE, UE 116 derives each of A-CSI-RS pattern B-CSI-RS pattern with replacing (resourceConfig,AntennaPortCount) by each of (A-resourceConfig,A-AntennaPortCount) and (B-resourceConfig, B-AntennaPortCount) according to TABLE 1.

In one example of joint configuration, (resourceConfig, AntennaPortCount) is configured for both A-CSI-RS and B-CSI-RS. When (resourceConfig,AntennaPortCount) is configured to UE 116, UE 116 first derives a CSI-RS pattern according to TABLE 1 with the configured (resourceConfig, AntennaPortCount). Then, the time frequency locations for $N_1$ A-CSI-RS APs and $N_2$ B-CSI-RS APs are determined according to a pre-defined way, where AntennaPortCount=$N_1+N_2$. Note that $N_1$ and $N_2$ can be RRC configured or be constants in the standard specification. Some examples of joint configuration are described in FIG. 8 and below.

In a first example (Example 1) When AntennaPortCount=8, $N_1$=4 and $N_2$=4, APs 15-18 are assigned for A-CSI-RS, and APs 19-22 are assigned for B-CSI-RS. In other words, A-CSI-RS and B-CSI-RS are FDM-multiplexed; and multiple CSI-RS ports in each of A-CSI-RS and B-CSI-RS are CDM multiplexed.

In a second example (Example 2) When AntennaPortCount=8, $N_1$=4 and $N_2$=4, APs (15, 17, 19, 21) are assigned for A-CSI-RS, and APs (16, 18, 20, 22) are assigned for B-CSI-RS. In other words, the 8 CSI-RS are multiplexed in 4 CDM groups of 2 REs each, wherein a first CDM code, e.g., [+1, +1] is assigned for A-CSI-RS; and a second CDM code, e.g., [+1, −1] is assigned for B-CSI-RS.

The resource configurations (resourceConfig) and AntennaPortsCount for A-CSI-RS and B-CSI-RS can be independently or jointly configured.

In one example of independent configuration, (A-resourceConfig, A-AntennaPortsCount) and (B-resourceConfig, B-AntennaPortCount) are configured for A-CSI-RS and B-CSI-RS. When these are configured to UE 116, UE 116 derives each of A-CSI-RS pattern B-CSI-RS pattern with replacing (resourceConfig,AntennaPortCount) by each of (A-resourceConfig,A-AntennaPortCount) and (B-resourceConfig, B-AntennaPortCount) according to TABLE 1.

In one example of joint configuration, (resourceConfig, AntennaPortCount) is configured for both A-CSI-RS and B-CSI-RS. When (resourceConfig,AntennaPortCount) is configured to UE 116, UE 116 first derives a CSI-RS pattern according to TABLE 1 with the configured (resourceConfig, AntennaPortCount). Then, the time frequency locations for $N_1$ A-CSI-RS APs and $N_2$ B-CSI-RS APs are determined according to a pre-defined way, where AntennaPortCount=$N_1+N_2$. Note that $N_1$ and $N_2$ can be RRC configured or be constants in the standard specification. Some examples of joint configuration are described in FIG. 8 and below.

In a first example, (Example 1) When AntennaPortCount=8, $N_1$=4 and $N_2$=4, APs 15-18 are assigned for A-CSI-RS, and APs 19-22 are assigned for B-CSI-RS. In other words, A-CSI-RS and B-CSI-RS are FDM-multiplexed; and multiple CSI-RS ports in each of A-CSI-RS and B-CSI-RS are CDM multiplexed.

In a second example (Example 2) When AntennaPortCount=8, $N_1$=4 and $N_2$=4, APs (15, 17, 19, 21) are assigned for A-CSI-RS, and APs (16, 18, 20, 22) are assigned for B-CSI-RS. In other words, the 8 CSI-RS are multiplexed in 4 CDM groups of 2 REs each, wherein a first CDM code, e.g., [+1, +1] is assigned for A-CSI-RS; and a second CDM code, e.g., [+1, −1] is assigned for B-CSI-RS.

Figure 8A:
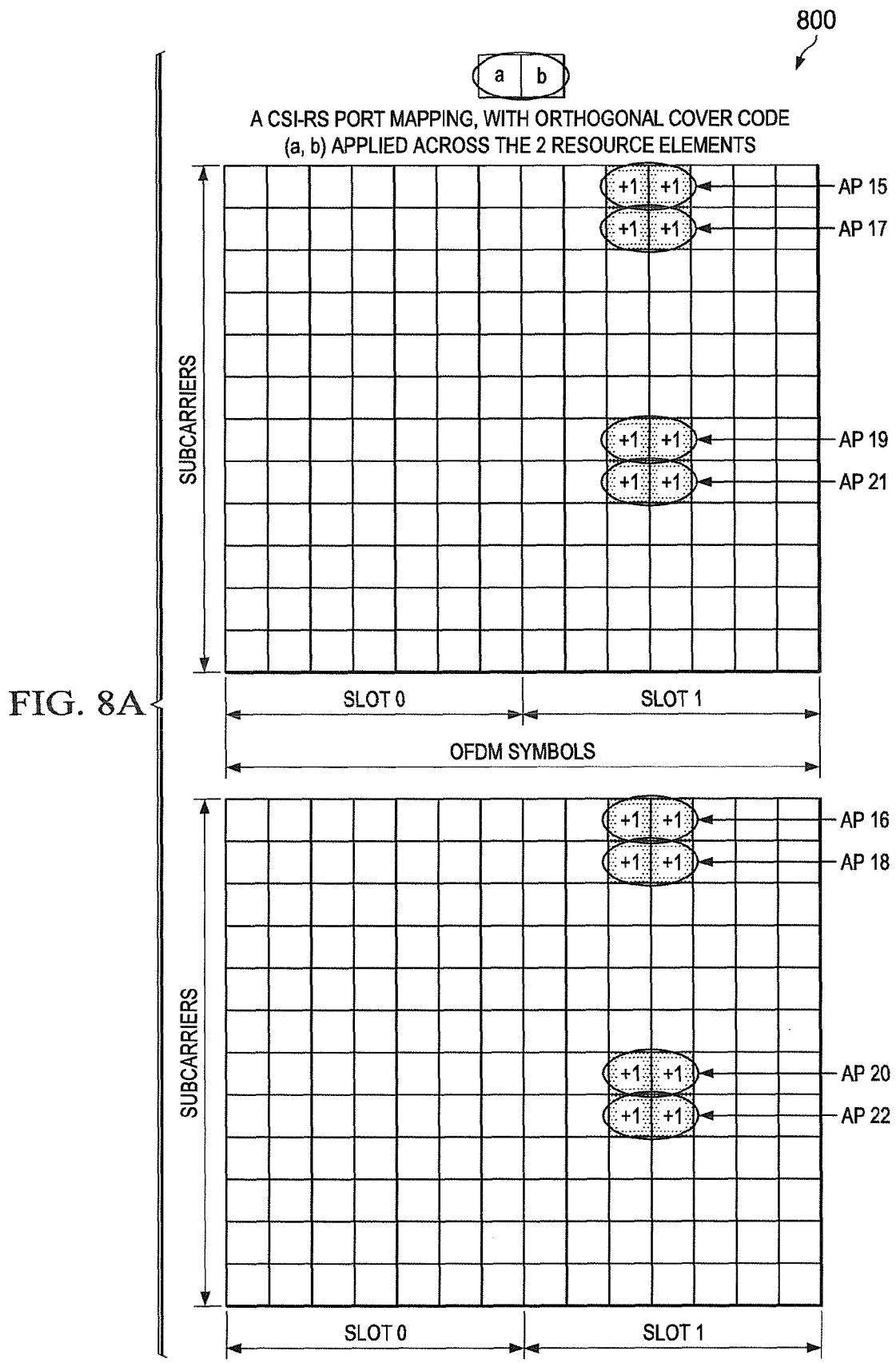
FIGS. 8A through 8C illustrates joint configuration of A- and B-CSI-RS according to embodiments of the present disclosure.
Figure 8B:
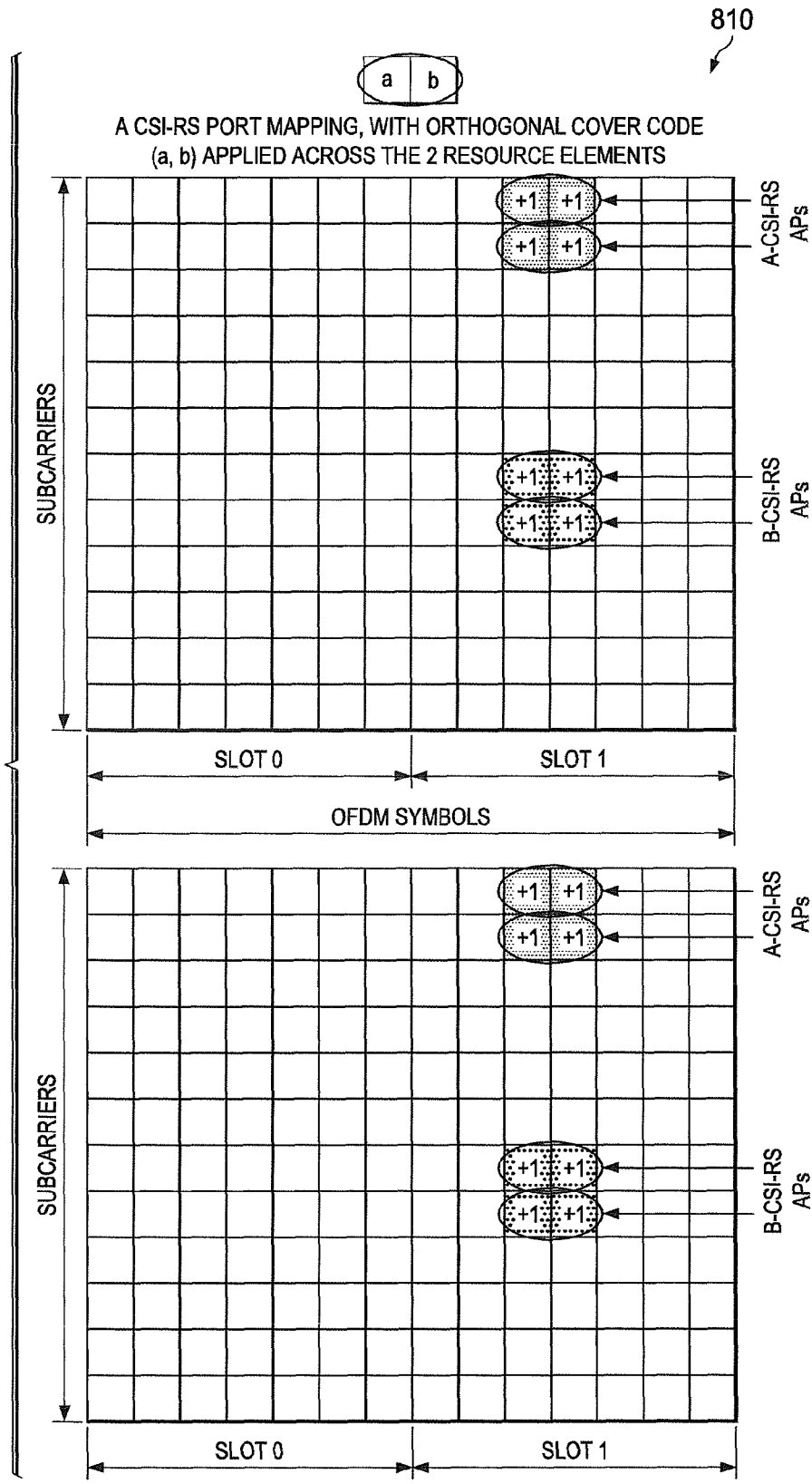
Figure 8C:
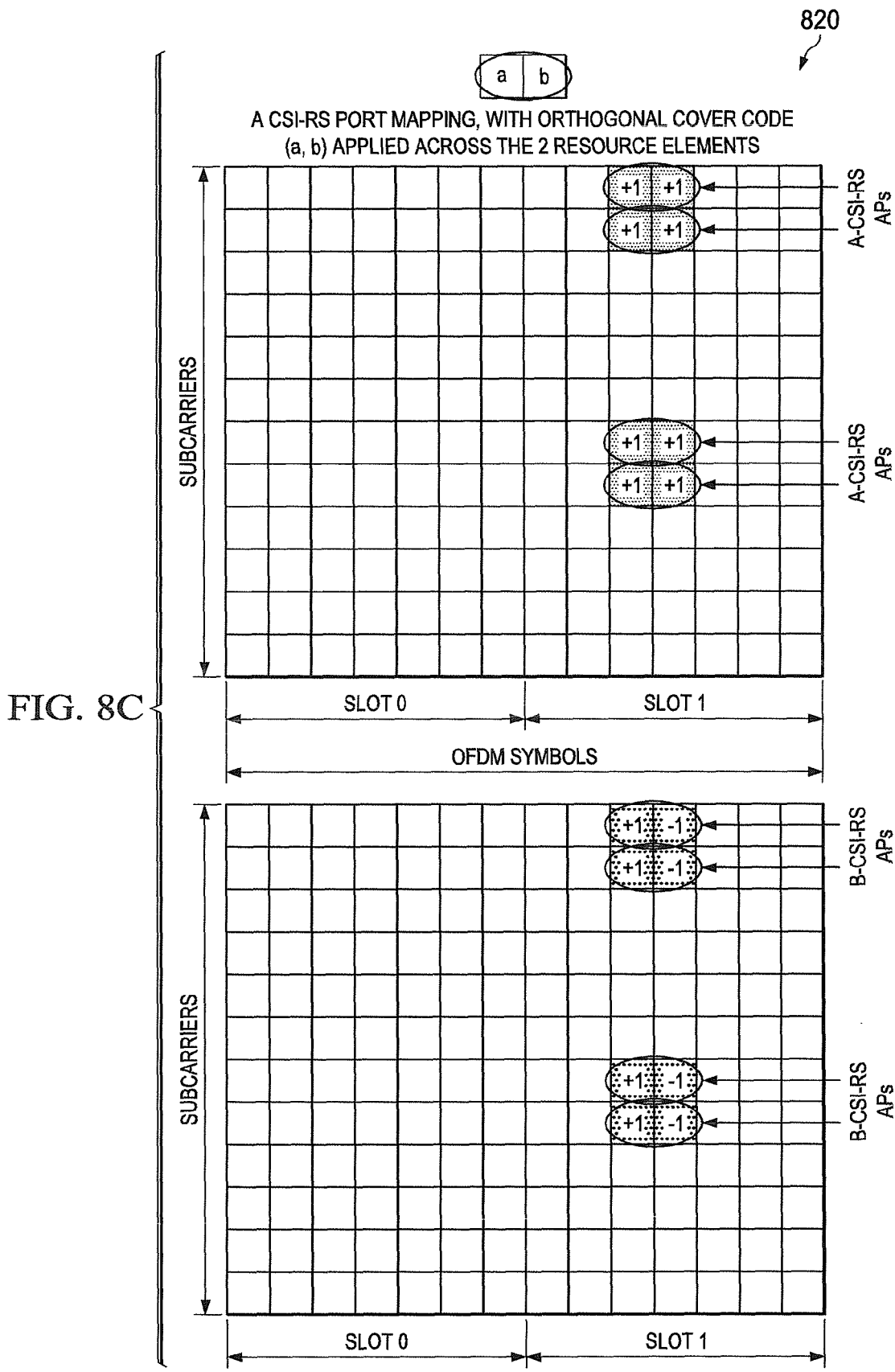

FIGS. 8A through 8C illustrates joint configuration of A- and B-CSI-RS according to embodiments of the present disclosure. The embodiments of the joint configuration 800, 810, 820 shown in FIGS. 8A through 8C are for illustration only. Other embodiments could be used without departing from the scope of this disclosure.

In certain embodiments, a common AntennaPortCount is configured for both A-CSI-RS and B-CSI-RS, and at the same time, A-resourceConfig and B-resourceConfig are separately configured for UE 116. In this case, UE 116 derives A-CSI-RS pattern and B-CSI-RS pattern with (A-resourceConfig, AntennaPortCount) and (B-resourceConfig,AntennaPortCount), respectively.

In addition, the total N number of antenna ports at TP 400 can be additionally signaled from A-AntennaPortCount and B-AntennaPortCount.

The subframe configurations (subframeConfig) for A-CSI-RS and B-CSI-RS can be independently or jointly configured.

In one example of independent configuration, for each of A-CSI-RS and B-CSI-RS, the subframe period and the subframe offset for the occurrence are configured as in the same way as the Rel-10 CSI-RS are configured. In this case, two parameters are configured to UE 116, i.e., A-CSI-RS-SubframeConfig and B-CSI-RS-SubframeConfig and UE 116 derives the subframe period and the subframe offset for the occurrence of each of B-CSI-RS and A-CSI-RS according to TABLE 2, with replacing CSI-RS-SubframeConfig by each of A-CSI-RS-SubframeConfig and B-CSI-RS-SubframeConfig.

In one example of joint configuration, for both A-CSI-RS and B-CSI-RS, the subframe configuration period and the subframe offset for the occurrence are configured as in the same way as the Rel-10 CSI-RS are configured. In this case, one parameter is configured to UE 116 as in Rel-10, i.e., CSI-RS-SubframeConfig and UE 116 derives the subframe period and the subframe offset for the occurrence of both B-CSI-RS and A-CSI-RS according to TABLE 2 with the configured CSI-RS-SubframeConfig.

It is noted that (A-CSI-RS, B-CSI-RS) can be (H-CSI-RS, V-CSI-RS), (a first H-CSI-RS, a second H-CSI-RS), (a primary CSI-RS, a secondary CSI-RS), as illustrated in later embodiments.

For configuration of CSI-RS transmission and CSI feedback for UE 116 configured with TM X, a new CSI process, referenced hereafter as CSI-Process-r12, is defined. To facilitate joint CQI transmission, the new CSI process is associated with two CSI resources, i.e., A-CSI-RS and B-CSI-RS, rather than one CSI-RS and one CSI-IM.

One illustration example construction of CSI-process-r12 is described below, where a common Pc (p-C-AndAntennaInfoDedList-r12) is configured for A-CSI-RS and B-CSI-RS.

```
CSI-Process-r12 ::= SEQUENCE {
    csi-ProcessIdentity-r12        CSI-ProcessIdentity-r12,
    a-csi-RS-IdentityNZP-r12       CSI-RS-IdentityNZP-r12,
    b-csi-RS-IdentityNZP-r12       CSI-RS-IdentityNZP-r12,
    p-C-AndAntennaInfoDedList-r12  SEQUENCE (SIZE (1..2)) OF P-C-AndAntennaInfoDed-r12,
    cqi-ReportBothPS-r12           CQI-ReportBothPS-r12
    OPTIONAL,   -- Need OR
    cqi-ReportPeriodidd-r12        INTEGER (0..maxCQI-Ext-r12)
    OPTIONAL,   -- Need OR
    cqi-ReportAperiodicPS-r12      CQI-ReportAperiodicPS-r12     OPTIONAL,
    -- Need OR
    ...}
```

In certain embodiments, when configuring a set of CSI-RS, a CSI-RS type is signaled in addition to other CSI-RS configuration parameters, e.g., CSI-RS pattern, subframe period, subframe offset, and power. The signaling can be either UE-specific or cell-specific. Depending on the configured CSI-RS type information, UE 116 derives CSI differently with estimating channels using the configured CSI-RS, e.g., based on different PMI codebooks.

In one example, a first CSI-RS type is associated with a first PMI codebook, and a second CSI-RS type is associated with a second PMI codebook.

The first and the second PMI codebooks can be a horizontal PMI codebook and a vertical PMI codebook, respectively. Here, the horizontal PMI codebook can be the same as one of Rel-8 and Rel-10 downlink 2-Tx, 4-Tx and 8-Tx PMI codebooks defined in the LTE specifications; and the vertical PMI codebook can be differently designed from the Rel-8 and Rel-10 downlink 2-Tx, 4-Tx and 8-Tx codebooks.

The first and the second PMI codebooks can have different sizes. That is, the first and the second PMI codebooks are composed of $M_1$ number of PMI matrices and $M_2$ number of PMI matrices respectively, wherein $M_1$ and $M_2$ can be different.

In one example, the first PMI codebook is a 4-bit codebook, composed of $M_1=16$ matrices; and the second PMI codebook is a 2-bit codebook, composed of $M_2=4$ matrices.

In certain embodiments, UE 116 is configured with a first set of CSI-RS of a first CSI-RS type and a second set of CSI-RS of a second CSI-RS type. UE 116 derives a first PMI according to the first PMI codebook with estimating channels using the first set of CSI-RS. UE 116 also derives a second PMI according to the second PMI codebook with estimating channels using the second set of CSI-RS.

The feedback reporting of the first PMI and the second PMI is configured either jointly or independently.

When the feedback reporting is independently (or individually) configured, the first PMI and the second PMI are reported to the eNB 102 according to the respective configurations.

When the feedback reporting is jointly configured, both the first PMI and the second PMI are reported in a single uplink physical channel transmitted in a subframe, e.g., on a PUSCH or aPUCCH.

Similarly, when configuring a set of CSI-RS, a PMI codebook information is signaled in addition to the other CSI-RS configuration parameters. According to the configured PMI codebook, UE 116 derives PMI with estimating channels using the configured CSI-RS. For example, when UE 116 is configured with a first set of CSI-RS and the first PMI codebook; and a second set of CSI-RS and the second PMI codebook, then, UE 116 derives a first PMI according to the first PMI codebook with estimating channels using the first set of CSI-RS. In addition, UE 116 derives a second PMI according to the second PMI codebook with estimating channels using the second set of CSI-RS. In one example, the first PMI codebook and the second PMI codebook are a horizontal PMI codebook and a vertical PMI codebook, respectively.

In certain embodiments, when CSI-process-r12 is newly defined as above, a CSI-RS configuration is implicitly associated with a PMI codebook. In one example, PMI estimated with A-CSI-RS (a-csi-RS-IdentityNZP-r12) is selected from the first codebook; and PMI estimated with B-CSI-RS (a-csi-RS-IdentityNZP-r12) is selected from the second codebook.

Figure 9:
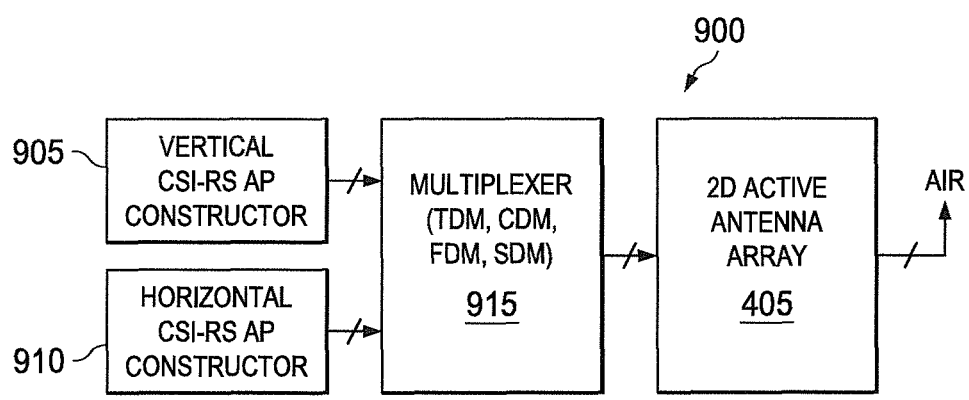
FIG. 9 illustrates Vertical CSI-RS APs and horizontal CSI-RS APs according to embodiments of the present disclosure.

FIG. 9 illustrates Vertical CSI-RS APs and horizontal CSI-RS APs according to embodiments of the present disclosure. The embodiment of the transmitter chain 900 including the Vertical CSI-RS APs and horizontal CSI-RS APs shown in FIG. 9 is for illustration only. Other embodiments could be used without departing from the scope of the present disclosure.

Configuration of Vertical and Horizontal CSI-RS APs:

In certain embodiments, two sets of CSI-RS APs 905, 910 out of the at least two sets of CSI-RS APs are separately constructed: one set consists of $N_V$ vertical CSI-RS (V-CSI-RS) APs 905, and the other set consists of $N_H$ horizontal CSI-RS (H-CSI-RS) APs 910. Here, the horizontal CSI-RS APs 910 are used for UEs' horizontal CSI (H-CSI) estimation, and the vertical CSI-RS APs 905 is used for UEs' vertical CSI (V-CSI) estimation.

When UE 116 is configured with $N_V$ V-CSI-RS APs 905 and $N_H$ H-CSI-RS APs 910, UE 116 can assume that the total number of antenna ports at the TP 400 is $N=N_H \times N_V$ for deriving at least one of joint CQI and joint PMI for the N antenna channels. In another design the total number of antenna ports at the TP is separately signaled to UE 116.

In certain embodiments, H-CSI-RS is associated with H-PMI codebook and V-CSI-RS is associated with V-PMI codebook. In certain embodiments, H-PMI codebook and V-CSI-RS codebook can be identical.

In one alternative, 3GPP LTE Rel-8 and Rel-10 2-Tx, 4-Tx and 8-Tx DL codebooks are reused for both H-PMI and V-PMI. In certain embodiments, UE 116 derives H-CSI using H-CSI-RS by applying the same procedure used for deriving Rel-10 CQI/PMI/RI based on Rel-10 CSI-RS. In certain embodiments, UE 116 derives V-CSI using V-CSI-RS by applying the same procedure used for deriving Rel-10 CQI/PMI/RI based on Rel-10 CSI-RS.

In another alternative, 3GPP LTE Rel-8 and Rel-10 2-Tx, 4-Tx, and 8-Tx DL codebooks are reused for H-PMI codebook only and V-PMI codebook is newly designed; or both the H-PMI and the V-PMI codebooks are newly designed.

Then, the CSI-RS configuration can include a CSI-RS type field, to indicate whether the configured CSI-RS is H-CSI-RS or V-CSI-RS. When UE 116 is configured with H-CSI-RS, UE 116 derives a PMI (H-PMI) using the H-PMI codebook with estimating channels using H-CSI-RS. Alternatively, when UE 116 is configured with V-CSI-RS, UE 116 derives a PMI (V-PMI) using the V-PMI codebook with estimating channels using V-CSI-RS.

Similarly, the CSI-RS configuration can include a PMI codebook information field, to indicate which PMI codebook should be used for deriving PMI using the configured CSI-RS. When UE 116 receives a configuration signaling of a CSI-RS and a H-PMI codebook, UE 116 derives a PMI (H-PMI) using the H-PMI codebook with estimating channels using the configured CSI-RS; on the other hand when UE 116 receives a configuration signaling of a CSI-RS and a V-PMI codebook, UE 116 derives a PMI (V-PMI) using the V-PMI codebook with estimating channels using the configured CSI-RS.

In another alternative, a PMI codebook information can be separately signaled from the CSI-RS configuration. Then, UE 116 derives H-PMI and V-PMI using either a first PMI codebook or a second PMI codebook, depending on the configured PMI codebook information. In certain embodiments, the first PMI codebook can be 3GPP LTE Rel-8 and Rel-10 2-Tx, 4-Tx, and 8-Tx DL codebooks; and the second PMI codebook can be a newly designed codebook.

In certain embodiments, the codebook sizes of the H-PMI codebook and the V-PMI codebook are different. In one example, for assigning better beam resolution of horizontal beams more than that of vertical beams, a larger size codebook is used for H-PMI than for V-PMI. In one example, for assigning better beam resolution of vertical beams more than that of horizontal beams, a larger size codebook is used for V-PMI than for H-PMI.

Figure 10:
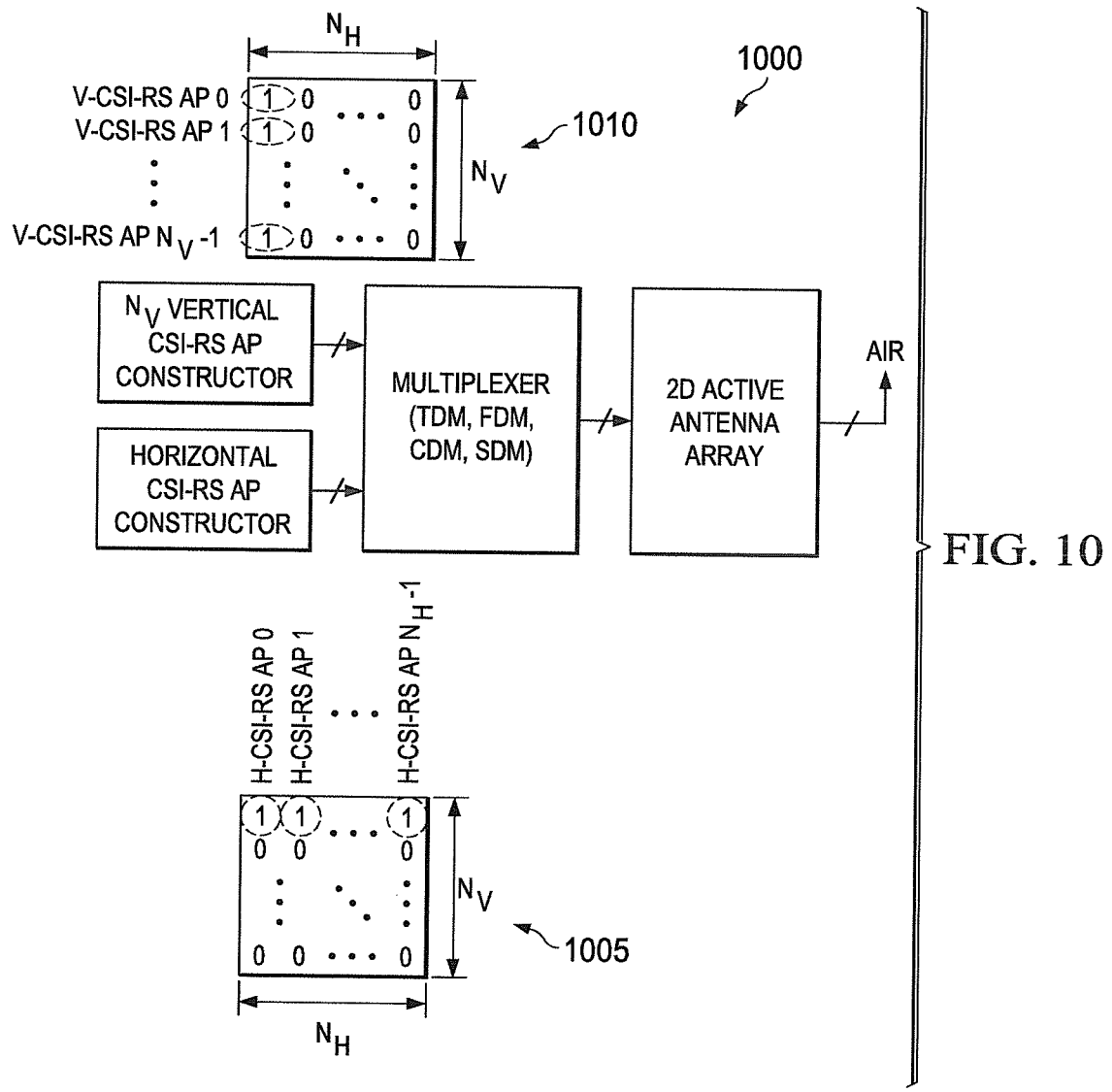
FIGS. 10 and 11 illustrate construction of the horizontal and the vertical CSI-RS APs according to embodiments of the present disclosure.

FIG. 10 illustrates construction of the horizontal and the vertical CSI-RS APs according to embodiments of the present disclosure. The embodiment of the construction 1000 shown in FIG. 10 is for illustration only. Other embodiments could be used without departing from the scope of this disclosure.

In certain embodiments, in the construction 1000 of the horizontal and the vertical CSI-RS APs (Construction Example 1) includes the $N_H$ horizontal CSI-RS APs (say, H-APs 0, . . . , $N_H$–1) are transmitted from a row 1005 of the active antenna array, while the $N_V$ vertical CSI-RS APs (say, V-APs 0, . . . , $N_V$–1) are transmitted from a column 1010 of the active antenna array. In the example shown in FIG. 10, the horizontal CSI-RS APs are transmitted from the first row 1005 of the antenna array, while the vertical CSI-RS APs are transmitted from the first column 1010 of the antenna array.

When the H-CSI-RS and V-CSI-RS are transmitted in the same subframe, one CSI-RS AP can be shared between the two sets of the CSI-RS APs. For example, only a single CSI-RS signal mapped onto single-port CSI-RS REs is transmitted for H-AP 0 and V-AP 0. Alternatively, the H-CSI-RS and V-CSI-RS can also be orthogonally and independently mapped in the time-frequency grid, even if the two CSI-RS APs are scheduled in the same subframe.

Figure 11:
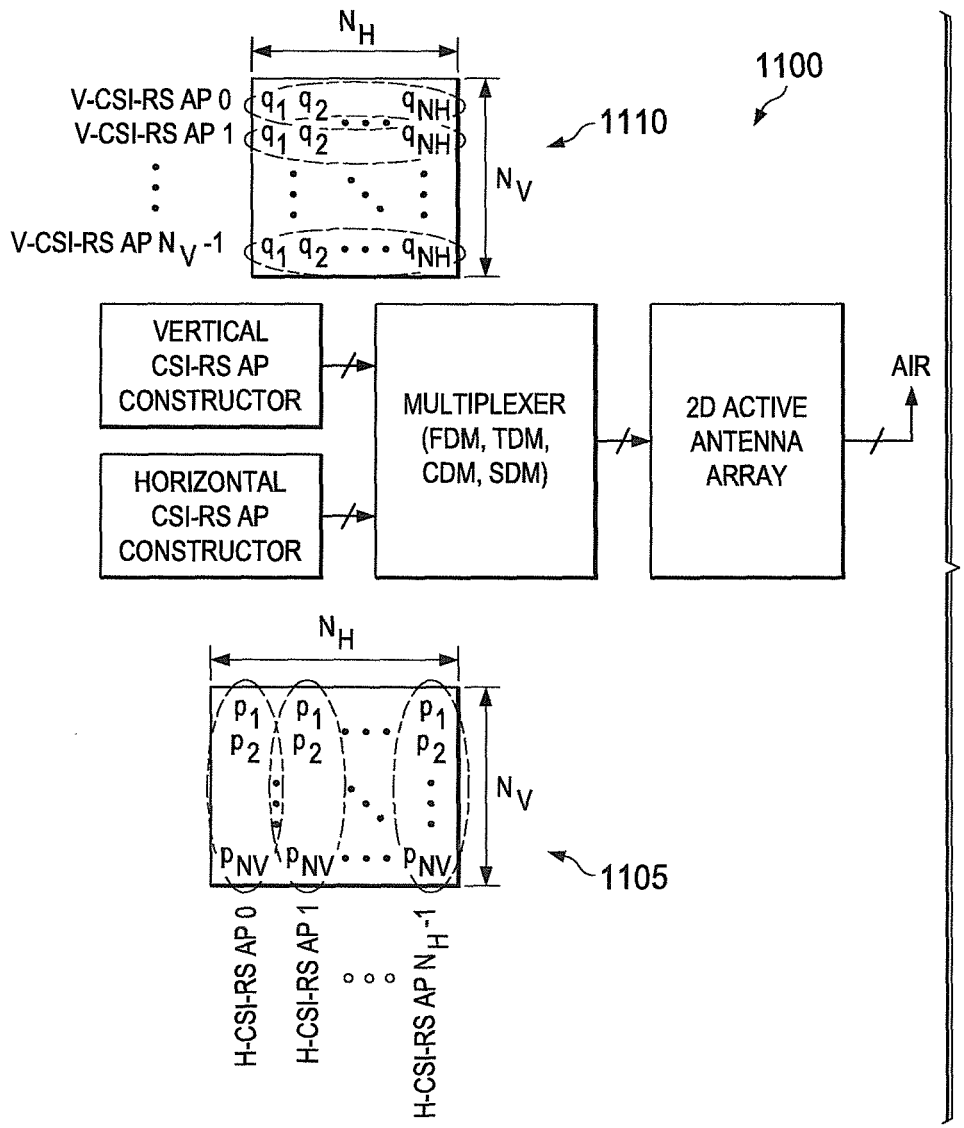

FIG. 11 illustrates construction of the horizontal and the vertical CSI-RS APs according to embodiments of the present disclosure. The embodiment of the construction 1100 shown in FIG. 11 is for illustration only. Other embodiments could be used without departing from the scope of this disclosure.

In certain embodiments, in the construction 1100 of the horizontal and the vertical CSI-RS APs (Construction Example 2), each of the $N_H$ horizontal CSI-RS for the $N_H$ H-CSI-RS APs (say, H-APs 0, . . . , $N_H$–1) are transmitted from a column 1105 of the active antenna array. Each H-CSI-RS signal is precoded with a precoding vector of $[p_1\ p_2\ \ldots\ p_{N_V}]^t$, where the precoding is applied across the antenna elements in each column of the active antenna array.

Alternatively, each of the $N_V$ vertical CSI-RS for the $N_V$ APs (say, V-APs 0, . . . , $N_V$–1) are transmitted from a row 1110 of the active antenna array. Each H-CSI-RS signal is precoded with a precoding vector of $[q_1\ q_2\ \ldots\ q_{N_H}]$, where the precoding is applied across the antenna elements in each row of the active antenna array.

The precoding to generate a CSI-RS signal also is referenced as antenna virtualization precoding. As shown in FIG. 11, the construction 1100 can be easily extended to a construction in which different precoding vectors are applied across different rows (or columns) corresponding to the different V-CSI-RS (or H-CSI-RS).

Figure 12:
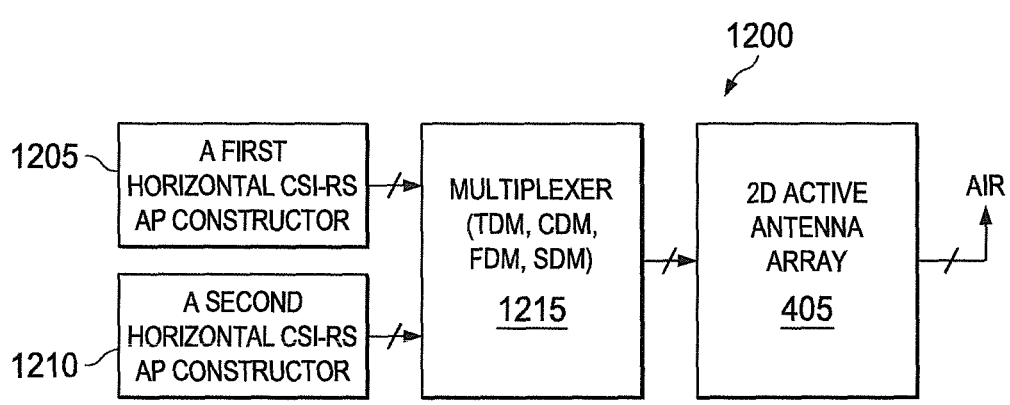
FIG. 12 illustrates first and second sets of horizontal CSI-RS APs according to embodiments of the present disclosure.

FIG. 12 illustrates first and second sets of horizontal CSI-RS APs according to embodiments of the present disclosure. The embodiment of the transmitter chain 1200 including the first and second sets of horizontal CSI-RS APs shown in FIG. 12 is for illustration only. Other embodiments could be used without departing from the scope of the present disclosure.

Configuration of a First and a Second Horizontal CSI-RS APs:

In certain embodiments, two sets of CSI-RS APs 1205, 1210 out of the at least two sets of CSI-RS APs are separately constructed: each of the two sets consists of $N_H$ H-CSI-RS APs corresponding to a row of antenna elements in the 2D active antenna array 405. Here, the two sets of H-CSI-RS APs 1205, 1210 are used for UEs' horizontal and vertical CSI estimation.

Figure 13:
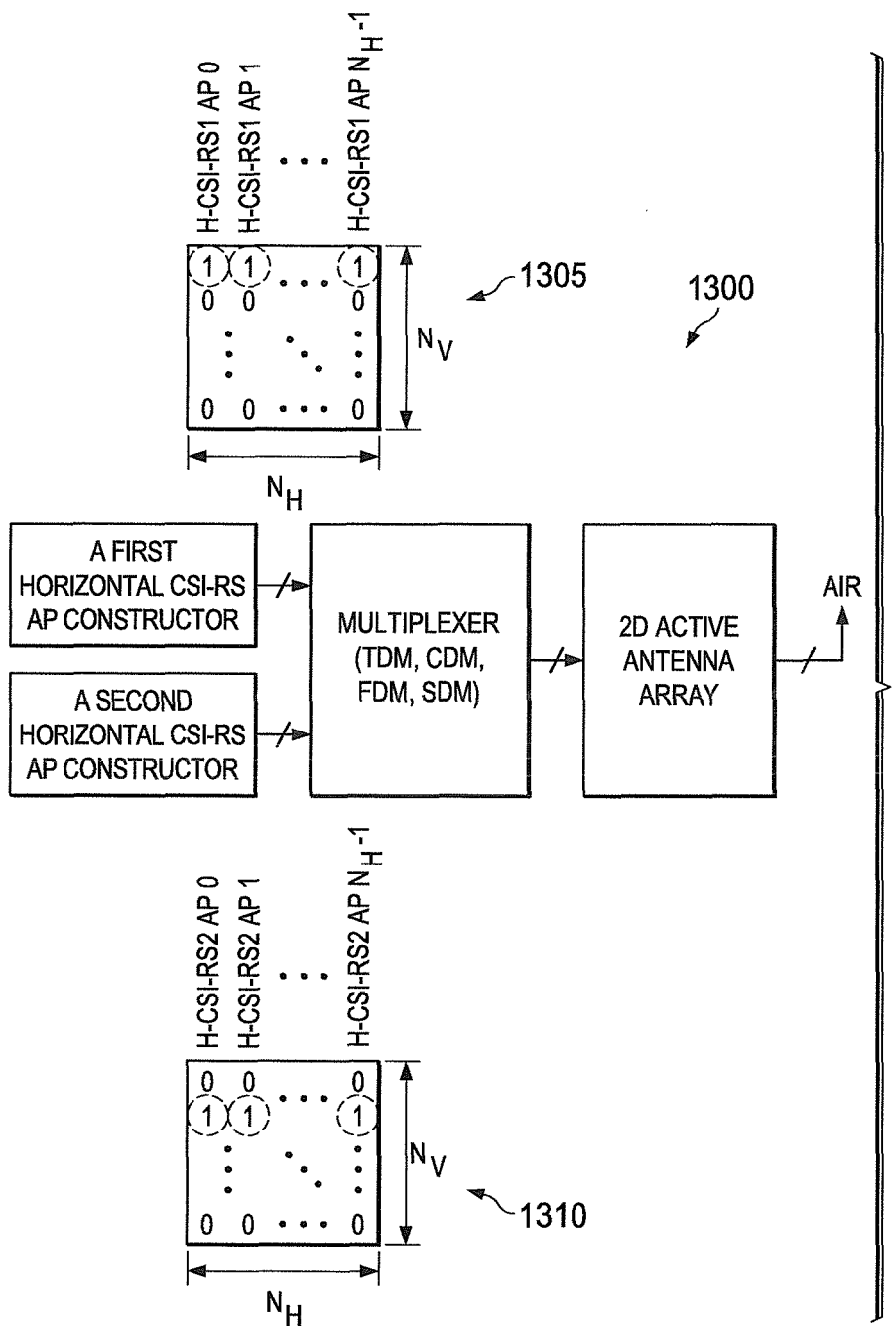
FIGS. 13 and 14 illustrate construction of two sets of H-CSI-RS APs according to embodiments of the present disclosure.

In this case, the total number of antenna ports at the TP N is separately RRC configured from the configurations for the two sets of CSI-RS 1205, 1210. The total number of antenna ports $N=N_H \times N_V$ is used for deriving at least one of joint CQI and joint PMI for the N antenna channels FIG. 13 illustrates construction of two sets of H-CSI-RS APs according to embodiments of the present disclosure. The embodiment of the construction 1300 shown in FIG. 13 is for illustration only. Other embodiments could be used without departing from the scope of this disclosure.

In certain embodiments, in the construction 1300 of the two sets of H-CSI-RS APs (Set Construction Example 1), the two rows of antenna elements corresponding to the two sets of H-CSI-RS APs are the first two rows 1305 in the 2D active antenna array 405. In this case, UE 116 determines the vertical CSI for the entire $N_H \times N_V$ antennas in the 2D active antenna array 405 by estimating the phase difference between the two rows, as well as the horizontal CSI by relying on the traditional methods of estimating horizontal CSI. The two rows are configurable by the network, in which case, the network is configured to indicate to each UE at least one of the following: The indices of the two rows corresponding to the two H-CSI-RS APs. For example, when the first two rows 1305, 1310 are corresponding to the two H-CSI-RS APs as in the example shown in FIG. 13, the network configures to each UE two row indices, row index 0 1305 and row index 1 1310.

In certain embodiments, eNB 102 signals to UE 116 the difference of the two indices of the two rows corresponding to the two H-CSI-RS APs. For example, when the first two rows are corresponding to the two H-CSI-RS APs as in the example shown in FIG. 13, the network configures to each UE the difference of the two row indices, i.e., (1−0)=1.

The example shown in FIG. 13 is for illustration only. The same idea can be used for constructing $N_V$ sets of H-CSI-RS APs corresponding to the $N_V$ rows of the 2D antenna array.

In one alternative, CSI-RS configuration includes a CSI-RS type field to indicate whether the configured CSI-RS is the first H-CSI-RS or the second H-CSI-RS.

Figure 14:
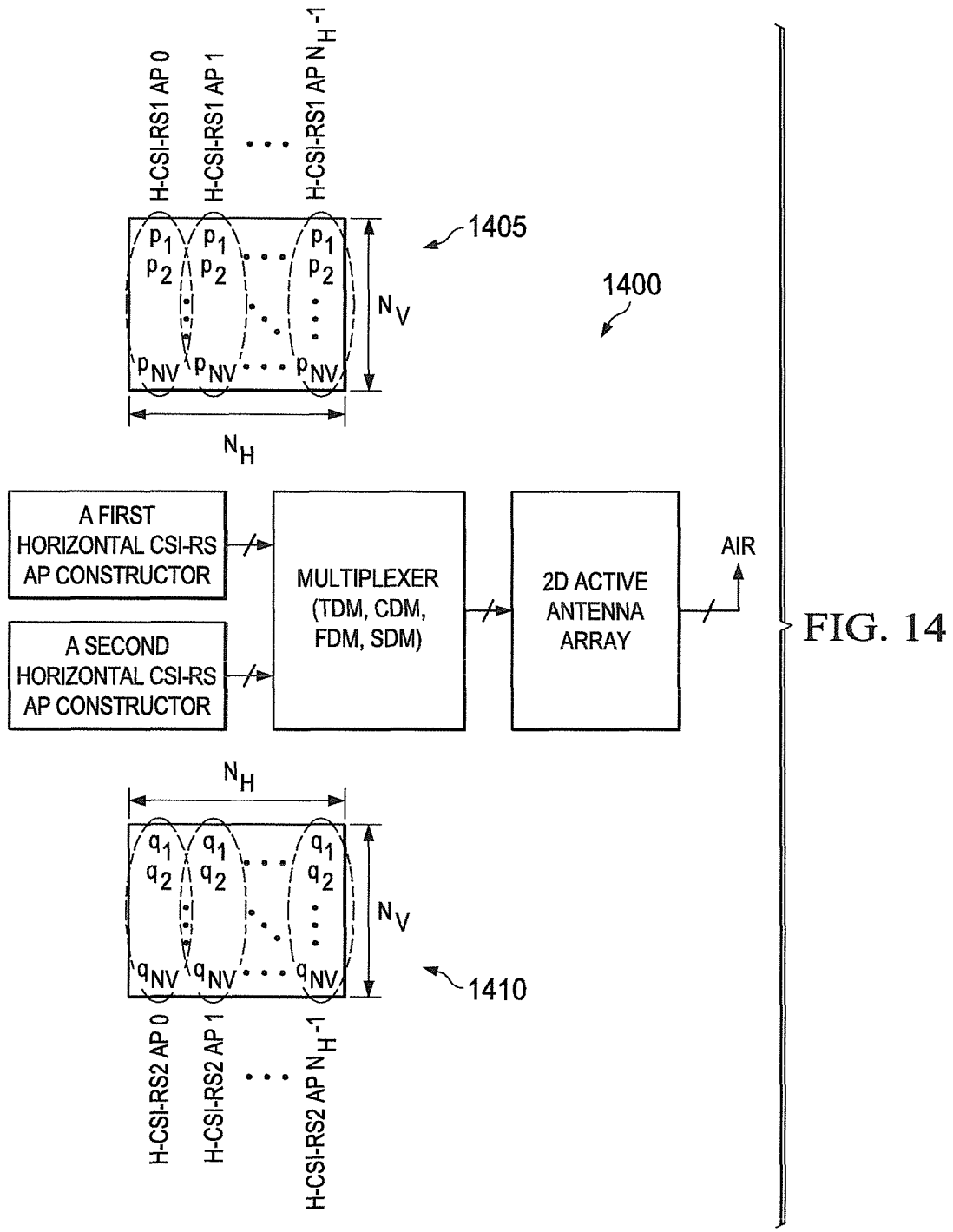

FIG. 14 illustrates Construction of two sets of H-CSI-RS APs according to embodiments of the present disclosure. The embodiment of the construction 1400 shown in FIG. 14 is for illustration only. Other embodiments could be used without departing from the scope of this disclosure.

In certain embodiments, in the construction 1400 of the two sets of H-CSI-RS APs (Set Construction Example 2), two different virtualization precoding vectors are applied to the two sets of H-CSI-RS APs 1405, 1410. Each H-CSI-RS signal in the first set 1405 is precoded with a precoding vector of $[p_1\ p_2\ \ldots\ p_{N_V}]^t$, and each H-CSI-RS in the second set is precoded with a precoding vector of $[q_1\ q_2\ \ldots\ q_{N_V}]^t$, where the precoding vector is applied across the antenna elements in each column of the active antenna array in each set of H-CSI-RS APs. UE 116 determines the vertical CSI for the entire $N_H \times N_V$ antennas in the 2D active antenna array 405 by estimating the phase difference between the two sets of H-CSI-RS APs 1405, 1410, as well as the horizontal CSI by relying on the traditional methods of estimating horizontal CSI. The two virtualization precoding vectors can be indicated by the network to each UE.

Figure 15:
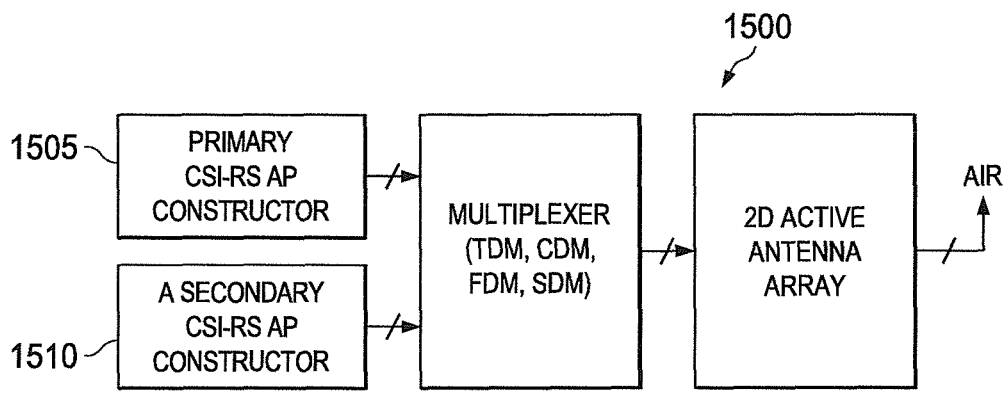
FIG. 15 illustrates primary and secondary CSI-RS APs according to embodiments of the present disclosure.

FIG. 15 illustrates primary and secondary CSI-RS APs according to embodiments of the present disclosure. The embodiment of the transmitter chain 1500 including the primary and secondary CSI-RS APs shown in FIG. 15 is for illustration only. Other embodiments could be used without departing from the scope of the present disclosure.

In one alternative, CSI-RS configuration includes a CSI-RS type field, to indicate whether the configured CSI-RS is the primary CSI-RS or the secondary CSI-RS.

Configuration of a First and a Second Horizontal CSI-RS APs:

In certain embodiments, two sets of CSI-RS APs out of the at least two sets of CSI-RS APs are separately constructed and configured (period as well): a set of primary CSI-RS APs 1505 and a set of secondary CSI-RS APs 1510.

Primary CSI-RS APs 1505: in certain embodiments, UE 116 utilizes the set of primary CSI-RS APs 1505 to derive either H-CSI or V-CSI, depending on whether the primary CSI-RS 1505 are corresponding to the ($N_H$) horizontally placed antenna elements or ($N_V$) vertically placed antenna elements. Whether UE 116 can derive H-CSI or V-CSI out of the primary CSI-RS 1505 is indicated by the network, or fixed in the standard specification (e.g., pre-stored in memory 360).

Secondary CSI-RS APs 1510: in certain embodiments, UE 116 combines the primary CSI-RS APs 1505 and the secondary CSI-RS APs 1510 to determine either V-CSI-RS or H-CSI-RS. In one example, when the primary CSI-RS 1505 correspond to the horizontally placed antenna elements and are used for estimating H-CSI-RS, the secondary CSI-RS APs 1510, together with the primary CSI-RS APs 1505, can be used for estimating the V-CSI-RS. In another example, when the primary CSI-RS APs 1505 correspond to the vertically placed antenna elements and are used for estimating V-CSI-RS, the secondary CSI-RS APs 1510 together with the primary CSI-RS APs 1505 can be used for estimating the H-CSI-RS. The number of secondary APs can be less than the number of the primary APs, and can be separately configured from the number of the primary CSI-RS APs 1505.

In this case, the total number of antenna ports at TP N is separately RRC configured from the configurations for the two sets of CSI-RS. The total number of antenna ports $N=N_H \times N_V$ is used for deriving at least one of joint CQI and joint PMI for the N antenna channels.

Figure 16:
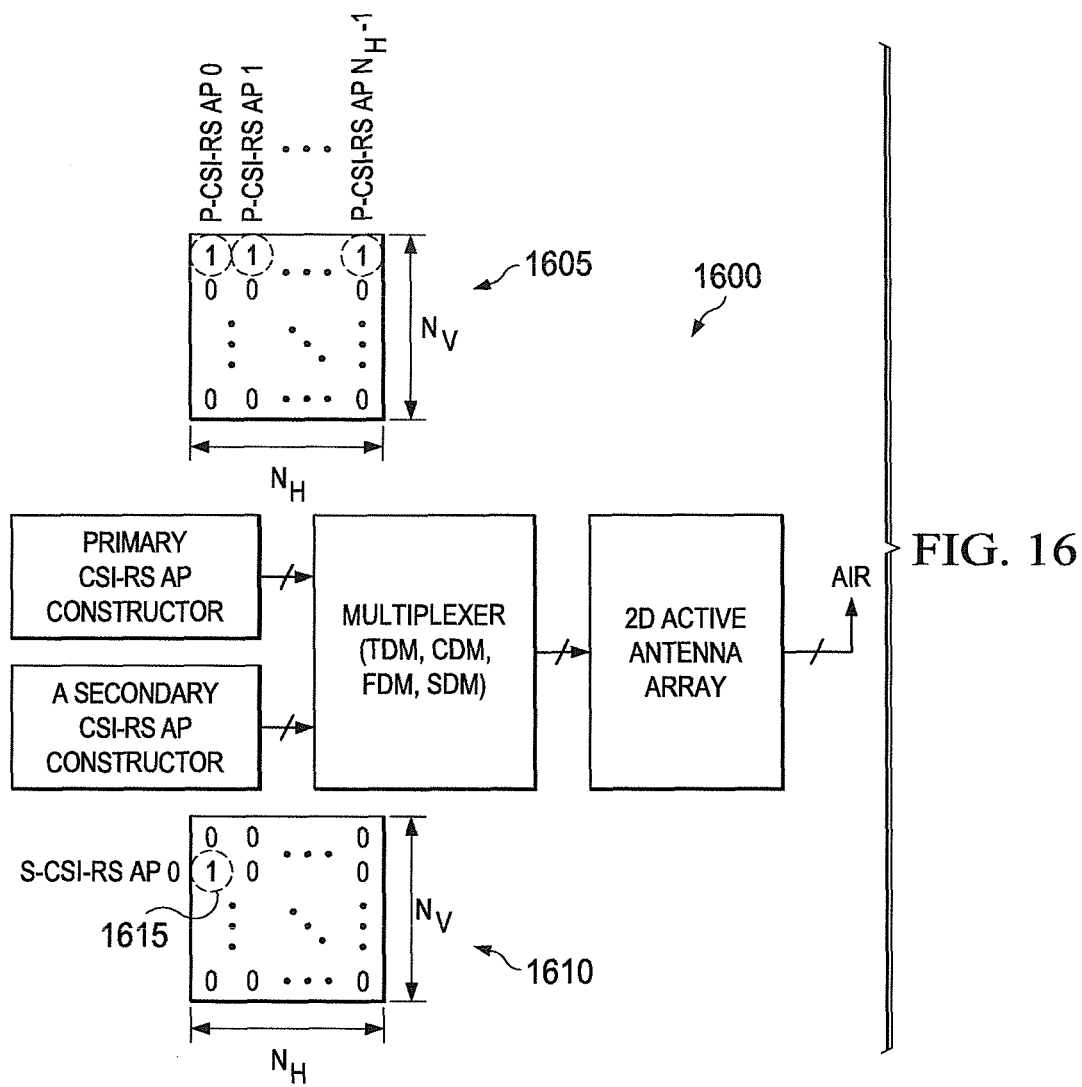
FIG. 16 illustrates construction of the primary and the secondary CSI-RS according to embodiments of the present disclosure.

FIG. 16 illustrates construction of the primary and the secondary CSI-RS according to embodiments of the present disclosure. The embodiment of the construction 1600 shown in FIG. 16 is for illustration only. Other embodiments could be used without departing from the scope of this disclosure.

In the example construction of the primary and the secondary CSI-RS shown in FIG. 16, the primary CSI-RS 1605 are H-CSI-RS, while only one AP is provided for the secondary CSI-RS 1610, which is the first antenna element 1615 of the second row of the 2D active antenna array 405. When UE 116 is configured with these primary and secondary CSI-RS, UE 116 derives H-CSI utilizing the primary CSI-RS, and UE 116 derives V-CSI utilizing the primary and the secondary CSI-RS, such as, by estimating the phase difference between the two types of CSI-RS. The relative location of the secondary CSI-RS with respect to the primary CSI-RS can be configured by the network.

In another method (method 3), the network is capable of configuring and transmitting at least two sets of CSI-RS APs. A first set of CSI-RS APs is used for horizontal CSI estimation at a first group of UEs, and a second set of CSI-RS APs is used for horizontal CSI estimation at a second group of UEs.

Each of the at least two sets of CSI-RS APs can be targeted to be best received in a certain distance from the TP (or a certain range of elevation angles). For example, a first set of CSI-RS is best received at distance of 0 m to 200 m, while the second set of CSI-RS is best received at distance of 200 m to 400 m. For this operation, the network can tailor antenna virtualization precoding method of each set of CSI-RS accordingly. That is, the first set of CSI-RS is virtualized with a first virtualization precoding so that it is best received at a first range of distances, and the second set of CSI-RS is virtualized with a second virtualization precoding so that it is best received at a second range of distances.

UE 116 can be configured for one set out of the at least two sets of CSI-RS APs by an RRC configuration. Then, UE 116 estimates horizontal CSI based on the configured set of CSI-RS APs.

UE 116 can be re-configured to estimate horizontal CSI based on a first set of CSI-RS APs from a second set of CSI-RS APs, by an RRC configuration.

UE 116 can be configured for the at least two sets of CSI-RS APs. UE 116 can estimate and report RSRPs for the at least two sets of CSI-RS APs, e.g., depending on a configured triggering condition.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a base station comprising:
    a two dimensional (2D) antenna array comprising a number N of antenna elements configured in a 2D grid $N_H \times N_v$, the 2D antenna array configured to communicate with at least one subscriber station; and
    a controller configured to transmit N channel-state-information reference-signal (CSI-RS) antenna ports (APs) associated with each of the N antenna elements, wherein the controller is configured to transmit at least two sets of CSI-RS APs and the at least one subscriber station derives and feeds back horizontal CSI (H-CSI) and vertical CSI (V-CSI) estimated by the at least one subscriber station receiving and processing the at least two sets of CSI-RS APs, and wherein a total number of CSI-RS APs is less than N.

2. The base station as set forth in claim 1, wherein the H-CSI comprises channel characteristics mainly associated with horizontally placed antenna elements estimated at the at least one subscriber station and includes horizontal channel quality indicator (CQI) (H-CQI), horizontal precoding matrix index (PMI) (H-PMI) and horizontal rank indicator (RI) (H-RI).

3. The base station as set forth in claim 1, wherein the V-CSI comprises channel characteristics mainly associated with vertically placed antenna elements estimated at the at least one subscriber station and includes vertical CQI (V-CQI), vertical PMI (V-PMI) and vertical RI (V-RI).

4. The base station as set forth in claim 1, wherein the controller is configured to multiplex a first set of CSI-RS APs and a second set of CSI-RS APs for the at least two sets of CSI-RS APs.

5. The base station as set forth in claim 4, wherein the multiplexer operation comprises one or more of: a time-domain multiplexing (TDM), code-domain multiplexing (CDM), frequency-domain multiplexing (FDM) and spatial-domain multiplexing (SDM) and wherein:
    when TDM multiplexing is applied, the controller is configured to transmit the CSI-RS corresponding to the at least two sets of CSI-RS APs at two different time locations comprising at least one of: in two different time slots, in two different subframes, in two different sets of OFDM symbols;
    when FDM multiplexing is applied, the controller is configured to transmit the CSI-RS corresponding to the at least two sets of CSI-RS APs at two different frequency or subcarrier locations;
    when CDM multiplexing is applied, the controller is configured to transmit the CSI-RS APs corresponding to the at least two sets of CSI-RS APs using two different orthogonal codes in the same time-frequency location;
    when SDM is applied, the controller is configured to transmit the CSI-RS APs corresponding to the at least two sets of CSI-RS APs in two different spatial beams and wherein the at least two sets of CSI-RS APs are differently scrambled using two different scrambling initializations; and
    when FDM/TDM multiplexing is applied, the controller is configured to transmit the CSI-RS APs corresponding to the at least two sets of CSI-RS APs at two different time-frequency location.

6. The base station as set forth in claim 1, wherein the at least two sets of CSI-RS APs comprise one of:
    A-CSI-RS AP and B-CSI-RS AP;
    a vertical CSI-RS AP and a horizontal CSI-RS AP;
    two horizontal CSI-RS APs; and
    a primary CSI-RS AP and a secondary CSI-RS AP.

7. A subscriber station configured to communicate with at least one base station using a multiple input multiple output (MIMO) communication, the subscriber station comprising:
    an antenna array configured to communicate with at least one base station; and
    processing circuitry configured to receive physical downlink shared channels (PDSCHs) from a two dimensional (2D) active antenna array at the at least one base station, the 2D active antenna array comprising a number N antenna elements; the processing circuitry further configured to estimate a horizontal channel state information (CSI) and vertical CSI associated with the N antenna elements, wherein the processing circuitry is configured to receive and process at least two sets of CSI-RS antenna ports (APs), and derive and feedback horizontal CSI (H-CSI) and vertical CSI (V-CSI) from the at least two sets of CSI-RS APs, wherein a total number of CSI-RS APs is less than N.

8. The subscriber station as set forth in claim 7, wherein the H-CSI comprises channel characteristics mainly associated with horizontally placed antenna elements estimated at the at least one subscriber station and includes horizontal channel quality indicator (CQI) (H-CQI), horizontal precoding matrix index (PMI) (H-PMI) and horizontal rank indicator (RI) (H-RI).

9. The subscriber station as set forth in claim 7, wherein the V-CSI comprises channel characteristics mainly associated with vertically placed antenna elements estimated at the at least one subscriber station and includes vertical CQI (V-CQI), vertical PMI (V-PMI) and vertical RI (V-RI).

10. The subscriber station as set forth in claim 7, a first set of CSI-RS and a second set of CSI-RS APs for the at least two sets of CSI-RS APs are multiplexed.

11. The subscriber station as set forth in claim 10, wherein the multiplexer operation comprises one or more of: a time-domain multiplexing (TDM), code-domain multiplexing (CDM), frequency-domain multiplexing (FDM) and spatial-domain multiplexing (SDM) and wherein:
    when TDM multiplexing is applied, the controller is configured to transmit the CSI-RS corresponding to the at least two sets of CSI-RS APs at two different time locations comprising at least one of: in two different time slots, in two different subframes, in two different sets of OFDM symbols;
    when FDM multiplexing is applied, the controller is configured to transmit the CSI-RS APs corresponding to the at least two sets of CSI-RS APs at two different frequency or subcarrier locations;
    when CDM multiplexing is applied, the controller is configured to transmit the CSI-RS APs corresponding to the at least two sets of CSI-RS APs using two different orthogonal codes in the same time-frequency location;
    when SDM is applied, the controller is configured to transmit the CSI-RS corresponding to the at least two sets of CSI-RS APs in two different spatial beams and wherein the at least two sets of CSI-RS APs are differently scrambled using two different scrambling initializations; and
    when FDM/TDM multiplexing is applied, the controller is configured to transmit the CSI-RS APs corresponding to the at least two sets of CSI-RS APs at two different time-frequency location.

12. The subscriber station as set forth in claim 7, wherein the at least two sets of CSI-RS APs comprise one of:
- A-CSI-RS AP and B-CSI-RS AP;
- a vertical CSI-RS AP and a horizontal CSI-RS AP;
- two horizontal CSI-RS APs; and
- a primary CSI-RS AP and a secondary CSI-RS AP.

13. For use in a wireless communication network, a method comprising:
- transmitting, from a two dimensional (2D) antenna array, N channel-state-information reference-signal (CSI-RS) antenna ports (APs), the 2D antenna array comprising a number N of antenna elements configured in a 2D grid $N_H \times N_v$, the CSI-RS APs associated with each of the N antenna elements, wherein transmitting comprises transmitting at least two sets of CSI-RS APs; and
- receiving a feedback signal from the at least one subscriber station, the feedback signal comprising horizontal CSI (H-CSI) and vertical CSI (V-CSI) estimated by the at least one subscriber station receiving and processing the at least two sets of CSI-RS APs, and wherein a total number of CSI-RS APs is less than N.

14. The method as set forth in claim 13, wherein the H-CSI comprises channel characteristics mainly associated with horizontally placed antenna elements estimated at the at least one subscriber station and includes horizontal CQI (H-CQI), horizontal PMI (H-PMI) and horizontal RI (H-RI).

15. The method as set forth in claim 13, wherein the V-CSI comprises channel characteristics mainly associated with vertically placed antenna elements estimated at the at least one subscriber station and includes vertical CQI (V-CQI), vertical PMI (V-PMI) and vertical RI (V-RI).

16. The method as set forth in claim 13, wherein transmitting comprises multiplexing a first set of CSI-RS and a second set of CSI-RS for the at least two sets of CSI-RS.

17. The method as set forth in claim 16, wherein multiplexing comprises one or more of: a time-domain multiplexing (TDM), code-domain multiplexing (CDM), frequency-domain multiplexing (FDM) and spatial-domain multiplexing (SDM) and wherein:
- when TDM multiplexing is applied, the controller is configured to transmit the CSI-RS corresponding to the at least two sets of CSI-RS APs at two different time locations comprising at least one of: in two different time slots, in two different subframes, in two different sets of OFDM symbols;
- when FDM multiplexing is applied, the controller is configured to transmit the CSI-RS corresponding to the at least two sets of CSI-RS APs at two different frequency or subcarrier locations;
- when CDM multiplexing is applied, the controller is configured to transmit the CSI-RS corresponding to the at least two sets of CSI-RS APs using two different orthogonal codes in the same time-frequency location;
- when SDM is applied, the controller is configured to transmit the CSI-RS corresponding to the at least two sets of CSI-RS APs in two different spatial beams and wherein the at least two sets of CSI-RS APs are differently scrambled using two different scrambling initializations; and
- when FDM/TDM multiplexing is applied, the controller is configured to transmit the CSI-RS corresponding to the at least two sets of CSI-RS APs at two different time-frequency location.

18. The method as set forth in claim 13, wherein the at least two sets of CSI-RS APs comprise one of:
- A-CSI-RS and B-CSI-RS;
- a vertical CSI-RS AP and a horizontal CSI-RS AP;
- two horizontal CSI-RS APs; and
- a primary CSI-RS AP and a secondary CSI-RS AP.

* * * * *